(12) United States Patent
Kato et al.

(10) Patent No.: US 12,365,346 B2
(45) Date of Patent: Jul. 22, 2025

(54) DRIVING SKILL EVALUATION SYSTEM, INFORMATION PROCESSING DEVICE, VEHICLE, AND NON-TRANSITORY COMPUTER-READABLE STORAGE MEDIUM

(71) Applicant: SUBARU CORPORATION, Tokyo (JP)

(72) Inventors: Riku Kato, Tokyo (JP); Noeru Sato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 29 days.

(21) Appl. No.: 18/469,629

(22) Filed: Sep. 19, 2023

(65) Prior Publication Data

US 2024/0001935 A1 Jan. 4, 2024

Related U.S. Application Data

(63) Continuation of application No. PCT/JP2021/041457, filed on Nov. 11, 2021.

(51) Int. Cl.
*B60W 40/09* (2012.01)
*B60W 40/02* (2006.01)
(Continued)

(52) U.S. Cl.
CPC ............ *B60W 40/09* (2013.01); *B60W 40/02* (2013.01); *B60W 50/14* (2013.01); *G06V 20/597* (2022.01);
(Continued)

(58) Field of Classification Search
CPC ...... B60W 40/09; B60W 40/02; B60W 50/14; B60W 2050/146; B60W 2420/403; B60W 2540/221; B60W 2540/225; B60W 2556/10; B60W 2556/45; B60W 50/0098; B60W 2050/0075; B60W 2540/103;
(Continued)

(56) References Cited

U.S. PATENT DOCUMENTS

2007/0225882 A1* 9/2007 Yamaguchi ........... B60W 50/14
701/45
2009/0187343 A1* 7/2009 Koch-Groeber ...... B60W 40/04
701/301

(Continued)

FOREIGN PATENT DOCUMENTS

JP 2008-298979 A 12/2008

*Primary Examiner* — Ryan W Sherwin
(74) *Attorney, Agent, or Firm* — Rimon P.C.

(57) ABSTRACT

A driving skill evaluation system is configured to evaluate, based on data of a behavior and an operation state of a vehicle, a driving skill of a driver who drives the vehicle. The driving skill evaluation system includes one or more processors and one or more memories communicatively connected to the one or more processors. The one or more processors are configured to: compare one or both of a surrounding environment of the vehicle and a driving state of the driver with a predetermined determination condition to determine whether the vehicle is in a situation in which a driving operation performed by the driver is restricted; adjust, based on the situation in which the driving operation is restricted, an evaluation method of the driving skill; and perform an evaluation of the driving skill.

3 Claims, 13 Drawing Sheets

(51) Int. Cl.
*B60W 50/14* (2020.01)
*G06V 20/59* (2022.01)

(52) U.S. Cl.
CPC . *B60W 2050/146* (2013.01); *B60W 2420/403* (2013.01); *B60W 2540/221* (2020.02); *B60W 2540/225* (2020.02); *B60W 2556/10* (2020.02); *B60W 2556/45* (2020.02)

(58) Field of Classification Search
CPC .......... B60W 2540/12; B60W 2540/18; G06V 20/597; G09B 19/00
See application file for complete search history.

(56) References Cited

U.S. PATENT DOCUMENTS

| | | | |
|---|---|---|---|
| 2010/0315217 A1* | 12/2010 | Miura | B60W 30/18009 340/436 |
| 2011/0307188 A1* | 12/2011 | Peng | G01C 21/3697 702/33 |
| 2013/0052614 A1* | 2/2013 | Mollicone | G09B 19/167 434/65 |
| 2014/0365029 A1* | 12/2014 | Sugimoto | G08G 1/0112 701/1 |
| 2018/0126901 A1* | 5/2018 | Levkova | B60W 40/09 |
| 2019/0202477 A1* | 7/2019 | Kapuria | G06V 20/597 |
| 2019/0276036 A1* | 9/2019 | Noguchi | B60W 30/18 |
| 2020/0031359 A1* | 1/2020 | Suzuki | G06V 20/597 |
| 2021/0362737 A1* | 11/2021 | Park | G07C 5/0825 |

* cited by examiner

FIG. 4

| EXTERNAL FACTOR/ INTERNAL FACTOR | SITUATION IN WHICH DRIVING OPERATION IS RESTRICTED |
|---|---|
| EXTERNAL FACTOR | PRECEDING VEHICLE IS SLOW |
| | FOLLOWING VEHICLE IS TAILGATING |
| | OBSTACLE IS PRESENT ON ROAD |
| | ROAD CONDITION IS BAD |
| INTERNAL FACTOR | DRIVER IS FATIGUED |
| | DRIVER HAS NO TIME TO SPARE |

FIG. 5

| SPECIFIC DETERMINATION CONDITIONS FOR SITUATION IN WHICH PRECEDING VEHICLE IS SLOW |
|---|
| INTER-VEHICLE DISTANCE TO PRECEDING VEHICLE IS CONTINUOUSLY SHORTER THAN THAT IN NORMAL DRIVING |
| RELATIVE SPEED OF PRECEDING VEHICLE WITH RESPECT TO HOST VEHICLE IS LESS THAN OR EQUAL TO THRESHOLD VALUE |
| BRAKE OPERATION IS FREQUENTLY PERFORMED |
| DRIVER FREQUENTLY GAZES AT PRECEDING VEHICLE |

FIG. 6

| SPECIFIC DETERMINATION CONDITIONS FOR SITUATION IN WHICH FOLLOWING VEHICLE IS TAILGATING |
|---|
| INTER-VEHICLE DISTANCE TO FOLLOWING VEHICLE IS CONTINUOUSLY SHORTER THAN THAT IN NORMAL DRIVING |
| RELATIVE SPEED OF FOLLOWING VEHICLE WITH RESPECT TO HOST VEHICLE IS GREATER THAN OR EQUAL TO THRESHOLD VALUE |
| SPECIFIC DRIVING OPERATION IS PERFORMED IN SITUATION IN WHICH FOLLOWING VEHICLE IS PRESENT |
| DRIVER FREQUENTLY GAZES AT REARVIEW MIRROR IN SITUATION IN WHICH FOLLOWING VEHICLE IS PRESENT |
| DRIVER IS IRRITATED IN SITUATION IN WHICH FOLLOWING VEHICLE IS PRESENT |

FIG. 9

| SPECIFIC DETERMINATION CONDITIONS FOR SITUATION IN WHICH DRIVER IS FATIGUED |
|---|
| DRIVER IS DROWSY |
| CONTINUOUS DRIVING TIME IS GREATER THAN OR EQUAL TO THRESHOLD VALUE |
| FATIGUE IS ESTIMATED FROM ACTIVITY DETAILS/ACTIVITY TIME OF DRIVER |
| DRIVER HAS LITTLE CONVERSATION WITH OCCUPANT |

FIG. 10

| SPECIFIC DETERMINATION CONDITIONS FOR SITUATION IN WHICH DRIVER HAS NO TIME TO SPARE |
|---|
| THERE IS NO TIME TO SPARE BEFORE EARLIEST SCHEDULE |
| DRIVER IS IN MORE HURRY THAN IN NORMAL DRIVING |

DRIVING SKILL EVALUATION SYSTEM, INFORMATION PROCESSING DEVICE, VEHICLE, AND NON-TRANSITORY COMPUTER-READABLE STORAGE MEDIUM

CROSS-REFERENCE TO RELATED APPLICATIONS

This application is continuation of International Application No. PCT/JP2021/041457, filed on Nov. 11, 2021, the entire contents of which are hereby incorporated by reference.

BACKGROUND

The present disclosure relates to a driving skill evaluation system, an information processing device, a vehicle, a computer program, and a recording medium on which the computer program is recorded, for evaluating a driving skill of a driver who drives a vehicle.

There is known a system that evaluates a driving skill of a driver and feeds back an evaluation result to the driver. By feeding back the evaluation result of the driving skill to the driver, it is expected to urge the driver to improve a driving act.

For example, Japanese Unexamined Patent Application Publication (JP-A) No. 2008-298979 discloses a driving skill evaluation device. The driving skill evaluation device extracts a situation of a driving operation caused by an operation of a driver of a vehicle, based on actual traveling behavior data and estimated behavior data. The actual traveling behavior data represents a traveling situation in which the vehicle has actually traveled a predetermined section to a desired destination. The estimated behavior data is obtained by estimating an ideal traveling situation in which the vehicle is assumed to have actually traveled the predetermined section to the desired destination. The driving skill evaluation device generates driving operation data based on the extraction result, and evaluates the driving skill of the driver.

SUMMARY

An aspect of the present disclosure provides a driving skill evaluation system configured to evaluate, based on data of a behavior and an operation state of a vehicle, a driving skill of a driver who drives the vehicle, the driving skill evaluation system including: one or more processors; and one or more memories communicatively connected to the one or more processors, in which the one or more processors are configured to: compare one or both of a surrounding environment of the vehicle and a driving state of the driver with a predetermined determination condition to determine whether the vehicle is in a situation in which a driving operation performed by the driver is restricted; adjust, based on the situation in which the driving operation is restricted, an evaluation method of the driving skill; and perform an evaluation of the driving skill.

An aspect of the present disclosure provides an information processing device configured to evaluate, based on data of a behavior and an operation state of a vehicle, a driving skill of a driver who drives the vehicle, the information processing device including: one or more processors; and one or more memories communicatively connected to the one or more processors, in which the one or more processors are configured to: compare one or more of a surrounding environment of the vehicle and a driving state of the driver with a predetermined determination condition to determine whether the vehicle is in a situation in which a driving operation performed by the driver is restricted; adjust, based on the situation in which the driving operation is restricted, an evaluation method of the driving skill; and perform an evaluation of the driving skill.

An aspect of the present disclosure provides a vehicle including a processor configured to: detect a surrounding environment of the vehicle; obtain information on a driving state of a driver who drives the vehicle; detect a behavior and an operation state of the vehicle; compare one or both of the surrounding environment of the vehicle and the driving state of the driver with a predetermined determination condition to determine whether the vehicle is in a situation in which a driving operation performed by the driver is restricted; and adjust, based on the situation in which the driving operation is restricted, an evaluation method of the driving skill of the driver and perform, based on data of the behavior and the operation state of the vehicle, an evaluation of the driving skill.

An aspect of the present disclosure provides a non-transitory computer-readable storage medium storing a computer program to be applied to a driving skill evaluation system configured to evaluate, based on data of a behavior and an operation state of a vehicle, a driving skill of a driver who drives the vehicle. The computer program causing one or more processors to execute a process including: comparing one or both of a surrounding environment of the vehicle and a driving state of the driver with a predetermined determination condition to determine whether the vehicle is in a situation in which a driving operation performed by the driver is restricted; adjusting, based on the situation in which the driving operation is restricted, an evaluation method of the driving skill; and performing an evaluation of the driving skill.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

FIG. 4 illustrates examples of a situation in which a driving operation performed by a driver is restricted;

FIG. 5 illustrates determination conditions for a situation in which a preceding vehicle is slow;

FIG. 6 illustrates determination conditions for a situation in which a following vehicle is tailgating;

FIG. 9 illustrates determination conditions for a situation in which the driver is fatigued;

FIG. 10 illustrates determination conditions for a situation in which the driver has no time to spare;

DETAILED DESCRIPTION

The device of the related art for evaluating the driving skill disclosed in JP-A No. 2008-298979 or the like evaluates the driving skill of the driver without consideration of a situation in which the driving operation performed by the driver is restricted. For example, the driving skill evaluation device disclosed in No. 2008-298979 generates the estimated behavior data. In the estimated behavior data, the ideal traveling situation is estimated based on road shape data representing a road shape of the predetermined section to the desired destination. The driving skill evaluation device disclosed in No. 2008-298979 compares the actual traveling behavior data with the estimated behavior data to evaluate the driving skill of the driver. Therefore, even in a situation in which a normal driving operation is hindered due to other vehicles, road conditions, or the like, or in which a normal driving operation is difficult due to the driver's physical condition or the like, the driving skill is evaluated without consideration of such a situation.

It is desirable to provide a driving skill evaluation system, an information processing device, a vehicle, a computer program, and a recording medium on which the computer program is recorded, for obtaining an appropriate evaluation result of a driving skill in consideration of a situation in which a driving operation performed by a driver is restricted.

Figure 1:
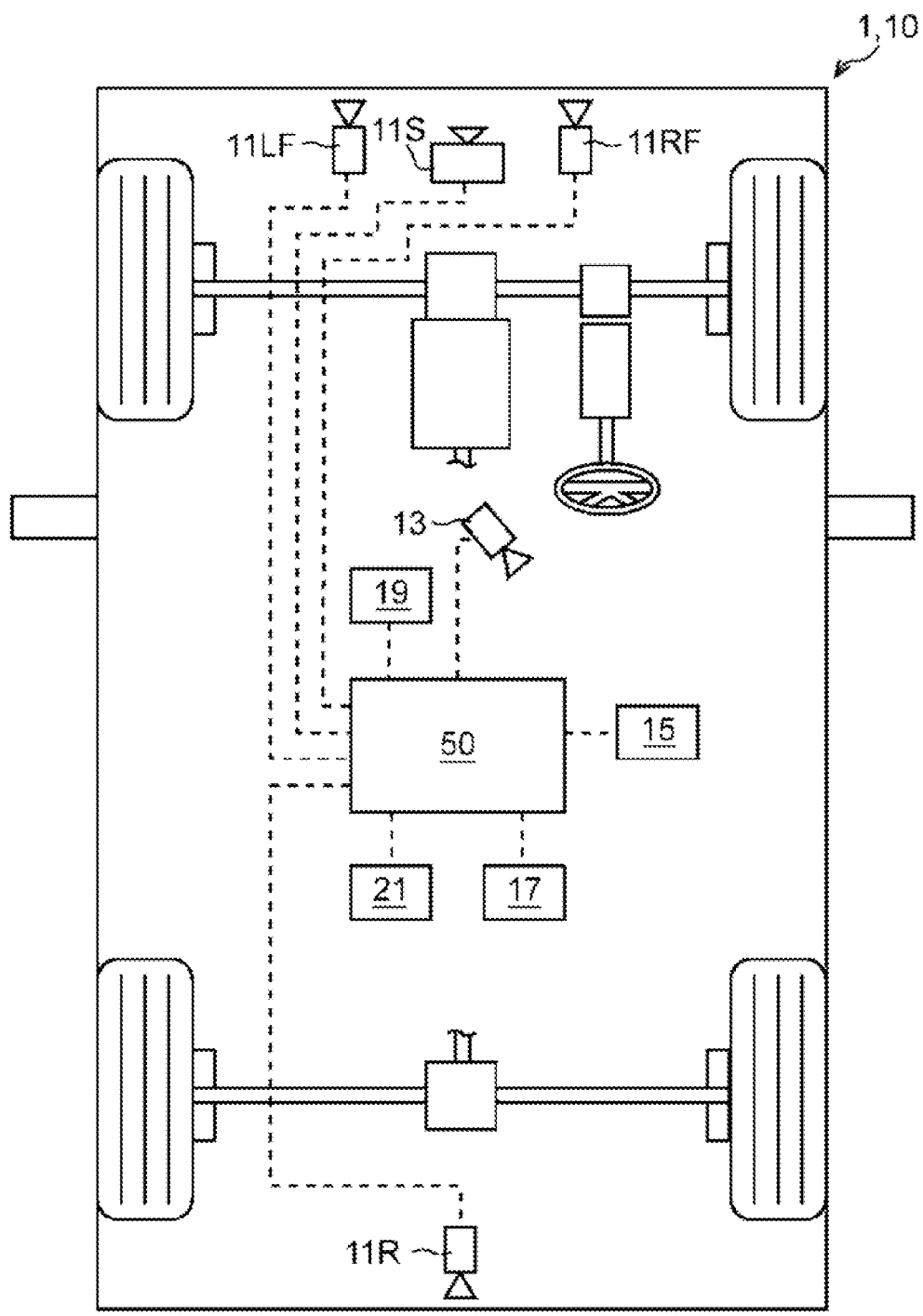
FIG. 1 is a schematic diagram illustrating an example of a configuration of a vehicle equipped with a driving skill evaluation system according to an embodiment of the present disclosure.
Figure 2:
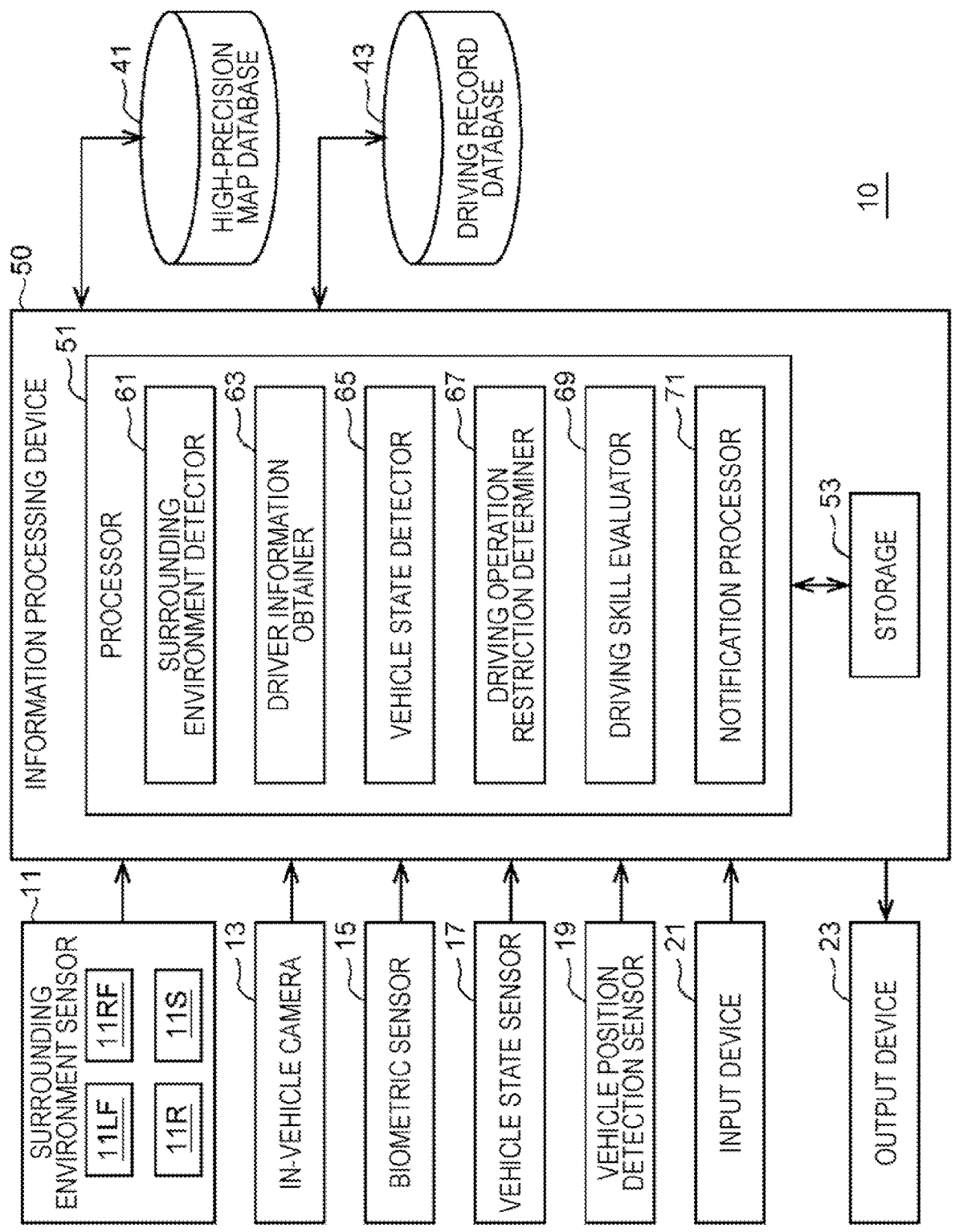
FIG. 2 is a block diagram illustrating an example of a configuration of the driving skill evaluation system according to the embodiment.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. 1. First Embodiment 1-1. Driving Skill Evaluation System First, an example of a configuration of a driving skill evaluation system 10 according to a first embodiment of the present disclosure will be described with reference to FIGS. 1 and 2. FIG. 1 is a schematic diagram illustrating a vehicle 1 equipped with the driving skill evaluation system 10, and FIG. 2 is a block diagram illustrating the example of the configuration of the driving skill evaluation system 10.

The driving skill evaluation system 10 includes a surrounding environment sensor 11, an in-vehicle camera 13, a biometric sensor 15, a vehicle state sensor 17, a vehicle position detection sensor 19, an input device 21, an output device 23, and an information processing device 50. The surrounding environment sensor 11, the in-vehicle camera 13, the biometric sensor 15, the vehicle state sensor 17, the vehicle position detection sensor 19, the input device 21, and the output device 23 are communicably connected to the information processing device 50 via a communication bus such as a dedicated line or a controller area network (CAN).

The surrounding environment sensor 11 includes one or more sensors that detect information on a surrounding environment of the vehicle 1. In the vehicle 1 illustrated in FIG. 1, the surrounding environment sensor 11 includes front cameras 11LF and 11RF, a rear camera 11R, and a LiDAR (Light Detection And Ranging) 11S. The front cameras 11LF and 11RF and the rear camera 11R capture images of a front part and a rear part of the vehicle 1 and generate image data. Each of the front cameras 11LF and 11RF and the rear camera 11R includes a CCD (Charge-Coupled Device) imaging element, a CMOS (Complementary Metal-Oxide-Semiconductor) imaging element, or the like and transmits the generated image data to the information processing device 50.

The front cameras 11LF and 11RF are configured as a stereo camera including a pair of left and right cameras, and the rear camera 11R is configured as a so-called monocular camera. However, each of the cameras may be either a stereo camera or a monocular camera. In addition to the front cameras 11LF and 11RF and the rear camera 11R, the vehicle 1 may include a camera that is provided on a side mirror, for example, and that captures an image of a left rear part or a right rear part.

The LiDAR 11S transmits an optical wave and receives a reflected wave of the optical wave, and detects an object and a distance to the object, based on a time from transmission of the optical wave to reception of the reflected wave. The LiDAR 11S transmits detection data to the information processing device 50. Instead of the LiDAR 11S or in addition to the LiDAR 11S, the vehicle 1 may include one or more of a radar sensor such as a millimeter wave radar and an ultrasonic sensor as a surrounding environment sensor for obtaining information on the surrounding environment.

The in-vehicle camera 13 includes one or more sensors that detect information on a driver who drives the vehicle 1. The in-vehicle camera 13 includes a CCD imaging element, a CMOS imaging element, or the like, captures an image of the inside of the vehicle, and generates image data. In this embodiment, the in-vehicle camera 13 is disposed so as to be capable of capturing an image of the driver of the vehicle 1. The in-vehicle camera 13 transmits generated image data to the information processing device 50. One or more in-vehicle cameras 13 may be installed.

The biometric sensor 15 detects biometric information of the driver and transmits detection data to the information processing device 50. The biometric sensor 15 may be, for example, a radio wave Doppler sensor for detecting the heart rate of the driver, or may be a non-wearable pulse sensor for detecting the pulse of the driver. Alternatively, the biometric sensor 15 may be an electrode set embedded in a steering wheel to measure the heartbeat or electrocardiogram of the driver. Furthermore, the biometric sensor 15 may be a pressure measuring instrument embedded in a driver's seat in order to measure a seating pressure distribution in a state in which the driver is seated in the seat. The biometric sensor 15 may also be a displacement sensor that detects changes in the position of a seat belt in order to measure the heartbeat or respiration of the driver. The biometric sensor 15 may be a TOF (Time of Flight) sensor for detecting information on the position of the driver. The biometric sensor 15 may also be a thermography sensor for measuring a surface temperature of the skin of the driver.

The biometric sensor 15 may also be a wearable sensor that is worn by the driver and detects the biometric information of the driver. The wearable biometric sensor 15 may be, for example, a wristwatch type or a head or arm wearable device. These wearable devices may have a function of detecting the biometric information such as the heart rate, pulse, blood pressure, or body temperature of the driver. The wearable biometric sensor 15 may be connected to the information processing device 50 directly or via a controller area network (CAN) or a local inter net (LIN). Alternatively, the wearable biometric sensor 15 may be configured to be capable of communicating with the information processing device 50 via Bluetooth (registered trademark), NFC (Near Field Communication), Wi-Fi (wireless fidelity), or wireless LAN (Local Area Network).

The vehicle state sensor 17 is a device that measures information indicating a behavior and an operation state of the vehicle 1. The vehicle state sensor 17 includes, for example, one or more of a vehicle speed sensor, an acceleration sensor, and an angular velocity sensor. The vehicle speed sensor detects, for example, a rotational speed of a drive axle of the vehicle 1. The acceleration sensor detects at least a longitudinal acceleration, which is an acceleration in a vehicle body longitudinal direction, and a lateral acceleration, which is an acceleration in a vehicle width direction. The acceleration sensor may further detect a vertical acceleration, which is an acceleration in the vehicle body height direction. The angular velocity sensor detects a change rate of each of a rotation angle (roll angle) about an axis in the vehicle body longitudinal direction, a rotation angle (pitch angle) about an axis in the vehicle width direction, and a rotation angle (yaw angle) about an axis in the vehicle body height direction. The angular velocity sensor may be a yaw rate sensor, which detects a change rate of a yaw angle.

The vehicle state sensor 17 includes a steering angle sensor, an accelerator pedal sensor, and a brake pedal sensor. The steering angle sensor detects a rotation angle of the steering wheel or a steering angle of steered wheels. The accelerator pedal sensor and the brake pedal sensor detect a depression amount of the accelerator pedal and a depression amount of the brake pedal, respectively.

Data measured by the vehicle state sensor 17 is transmitted to the information processing device 50. The vehicle state sensor 17 may include a sensor capable of detecting the behavior or the operation state of the vehicle 1 in addition to the vehicle speed sensor, the acceleration sensor, the angular velocity sensor, the steering angle sensor, the accelerator pedal sensor, and the brake pedal sensor.

The vehicle position detection sensor 19 is a sensor used for a GNSS (Global Navigation Satellite System) represented by a GPS (Global Positioning System). The vehicle position detection sensor 19 receives satellite signals transmitted from satellites and transmits position information of the vehicle 1 included in the satellite signals to the information processing device 50. In addition to the GPS, the vehicle position detection sensor 19 may include an antenna that receives satellite signals from another satellite system that specifies the position of the vehicle 1.

The input device 21 receives an operation input of a user and transmits the operation input to the information processing device 50. The input device 21 may be, for example, a touch panel type display or a dial type operation device. Alternatively, the input device 21 may be a speech recognition device that receives an input by a speech of an occupant, or may be an image recognition device that receives an input by a gesture.

The output device 23 is an output device for feeding back an evaluation result of the driving skill of the driver. The output device 23 includes an image display device such as an optical panel. The output device 23 may include a speaker.

The information processing device 50 includes, for example, one or more processors such as a CPU (Central Processing Unit). The information processing device 50 also includes, for example, one or more memories such as a RAM (Random Access Memory) or a ROM (Read Only Memory) communicably connected to the one or more processors. A part or all of the information processing device 50 may be configured by updatable firmware or the like, or may be a program module or the like executed by a command from the one or more processors.

The information processing device 50 functions as a device that evaluates the driving skill of the driver by each of the one or more processors executing a computer program. The computer program is a computer program for causing a processor to execute an operation described later to be executed by the information processing device 50. The computer program executed by the processor may be recorded on a recording medium functioning as a storage (memory) 53 included in the information processing device 50. The computer program may be recorded on a recording medium built in the information processing device 50 or any recording medium externally attachable to the information processing device 50.

The recording medium on which the computer program is recorded may be a magnetic medium such as a hard disk, a floppy disk, or a magnetic tape. The recording medium may be an optical recording medium such as a CD-ROM (Compact Disk Read Only Memory), a DVD (Digital Versatile Disk), or a Blu-ray (registered trademark). The recording medium may be a magneto-optical medium such as a floptical disk. The recording medium may be a storage element such as a RAM or a ROM. The recording medium may be a flash memory such as a USB (Universal Serial Bus) memory. The recording medium may be any other medium capable of storing a program.

Note that the information processing device 50 may be a device installed in the vehicle 1 or may be a portable device such as a smartphone.

1-2. Configuration of Information Processing Device

Next, a configuration of the information processing device 50 will be described. Hereinafter, the vehicle 1 driven by the driver whose driving skill is to be evaluated may be referred to as a "host vehicle".

The information processing device 50 includes a processor 51 and the storage 53. The processor 51 includes a surrounding environment detector 61, a driver information obtainer 63, a vehicle state detector 65, a driving operation restriction determiner 67, a driving skill evaluator 69, and a notification processor 71. The processor 51 is configured by a processor such as one or more CPUs. Each of the surrounding environment detector 61, the driver information obtainer 63, the vehicle state detector 65, the driving operation restriction determiner 67, the driving skill evaluator 69, and the notification processor 71 is a function implemented by execution of a program by the processor. However, some of the surrounding environment detector 61, the driver information obtainer 63, the vehicle state detector 65, the driving operation restriction determiner 67, the driving skill evaluator 69, and the notification processor 71 may be configured by an analog circuit.

The storage 53 includes one or more storage elements such as a RAM or a ROM. The storage 53 stores a program to be executed by the processor 51, various parameters used for executing the program, obtained data, data of a calculation result, or the like.

A high-precision map database 41 and a driving record database 43 are connected to the information processing device 50. The high-precision map database 41 is a database in which map data including at least information on road shapes and the number of traveling lanes is recorded.

The driving record database 43 is a database in which previous driving data of drivers are recorded. In the driving record database 43, data of the behavior and the operation state of the vehicle 1, information for identifying individual drivers, data of traveling points on map data, data of the surrounding environment of the vehicle 1, detection data of the biometric information of the driver, information on the kind of the situation in which the driving operation is restricted, information on a vehicle type, and the evaluation result of the driving skill are recorded in association with each other. The data of the behavior and the operation state of the vehicle 1 is measured by the vehicle state sensor 17.

The high-precision map database 41 and the driving record database 43 may be mounted in the vehicle 1, or may be provided in an external server or the like that can communicate via a mobile communicator.

Hereinafter, the functions of the surrounding environment detector 61, the driver information obtainer 63, the vehicle state detector 65, the driving operation restriction determiner 67, the driving skill evaluator 69, and the notification processor 71 of the processor 51 will be briefly described. Then, processing operations by the respective units will be described in detail.

Surrounding Environment Detector

The surrounding environment detector 61 performs a process of detecting the surrounding environment of the vehicle 1. For example, the surrounding environment detector 61 detects an obstacle present around the vehicle 1 and a road shape or a traveling lane, based on the detection data transmitted from the surrounding environment sensor 11. The surrounding environment detector 61 obtains information relating to the obstacle such as the type, size, position, and speed of the detected obstacle, the distance from the vehicle 1 to the obstacle, or the relative speed between the vehicle 1 and the obstacle. The detected obstacle includes other traveling vehicles, parked vehicles, pedestrians, bicycles, side walls, curbs, buildings, utility poles, traffic markings, traffic signals, natural objects, and any other objects present around the vehicle 1. In addition, the surrounding environment detector 61 recognizes white lines, side walls, curbs, and the like, for example.

Driver Information Obtainer

The driver information obtainer 63 executes a process of specifying the driver of the vehicle 1, based on the image data transmitted from the in-vehicle camera 13. Note that the driver information obtainer 63 may specify the driver of the vehicle 1, based on information input by the driver or the occupant via an input device such as a touch panel. In addition, the driver information obtainer 63 detects the direction of the line of sight of the driver, based on the image data transmitted from the in-vehicle camera 13. Furthermore, the driver information obtainer 63 obtains the biometric information of the driver, based on the detection data transmitted from the biometric sensor 15. The direction of the line of sight and the biometric information of the driver constitute a part of the information on a driving state of the driver.

Vehicle State Detector

The vehicle state detector 65 executes a process of detecting the behavior and the operation state of the vehicle 1. For example, the vehicle state detector 65 detects the behavior of the vehicle 1 and operation states of the steering wheel, the accelerator pedal, and the brake pedal, based on detection data transmitted from the vehicle state sensor 17. The behavior of the vehicle 1 includes the speed, acceleration, jerk, and yaw rate of the vehicle 1.

Driving Operation Restriction Determiner

The driving operation restriction determiner 67 executes a process of determining the situation in which the driving operation of the vehicle 1 performed by the driver is restricted. The determination is performed based on the information on the surrounding environment of the vehicle 1 detected by the surrounding environment detector 61 and the information on the driving state of the driver obtained by the driver information obtainer 63. For example, the driving operation restriction determiner 67 compares one or more of the surrounding environment of the vehicle 1 and the driving state of the driver with a predetermined determination condition to determine whether the vehicle 1 is in the situation in which the driving operation performed by the driver is restricted. In the situation in which the driving operation performed by the driver is restricted due to the surrounding environment of the vehicle 1, the driving operation is restricted due to an external factor, which does not depend on the driving state of the driver. On the other hand, in the situation in which the driving operation performed by the driver is restricted due to the driving state of the driver, the driving operation is restricted due to an internal factor of the driver. The driving operation restriction determiner 67 may use information other than the surrounding environment of the vehicle 1 and the driving state of the driver to determine whether the vehicle 1 is in the situation in which the driving operation performed by the driver is restricted.

Driving Skill Evaluator

The driving skill evaluator 69 executes a process of evaluating the driving skill of the driver. In this embodiment, the driving skill evaluator 69 adjusts, based on the situation in which the driving operation performed by the driver is restricted as determined by the driving operation restriction determiner 67, an evaluation method of the driving skill, and performs an evaluation of the driving skill. The driving skill evaluator 69 performs the evaluation of the driving skill by using a preset evaluation method. In the first embodiment, in a travel section where the driving operation performed by the driver is not restricted, the driving skill evaluator 69 calculates a driving skill score according to a basic evaluation method. On the other hand, in a travel section where the driving operation performed by the driver is restricted, the driving skill evaluator 69 adjusts the evaluation method according to the situation in which the driving operation is restricted. Accordingly, the influence of the driving operation that does not depend on the driving skill of the driver can be reduced, and an appropriate evaluation result of the driving skill can be obtained.

Notification Processor

The notification processor 71 performs a process of feeding back the evaluation result of the driving skill. For example, the notification processor 71 drives the output device 23 to display the evaluation result of the driving skill on a screen. The notification processor 71 may notify the driver of the evaluation result of the driving skill by voice or sound. When feeding back the evaluation result of the driving skill, the notification processor 71 also notifies the driver of an adjustment cause in a case where the evaluation method is adjusted. In this embodiment, if the evaluation method is adjusted, the notification processor 71 notifies the driver of an adjustment method of the evaluation method, the accuracy of the evaluation result of the driving skill, and an adjustment section together.

1-3. Processing Operation of Information Processing Device

The configurations of the driving skill evaluation system 10 and the information processing device 50 have been described above. Next, an example of a processing operation of the information processing device 50 will be described.

Figure 3:
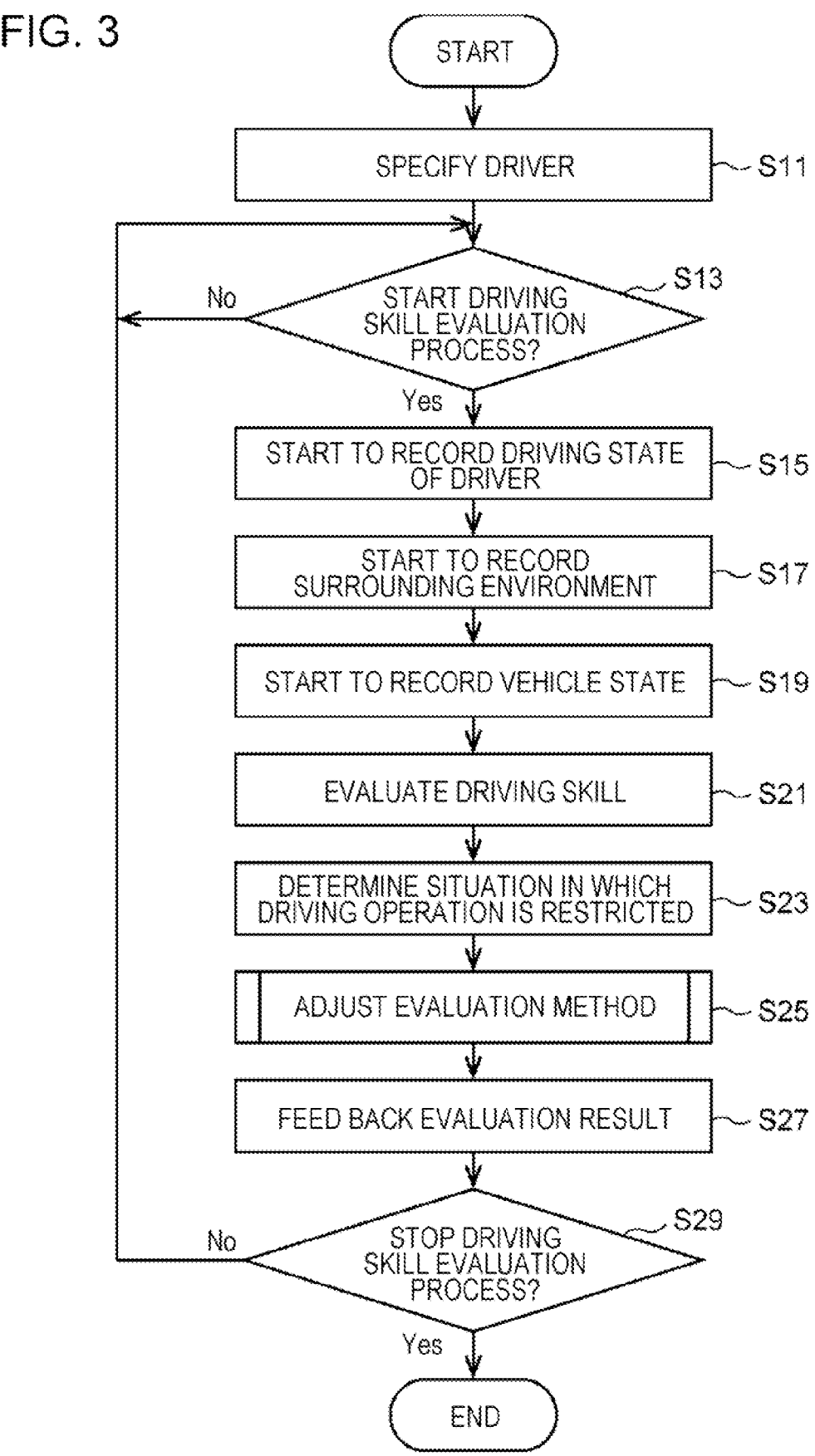
FIG. 3 is a flowchart illustrating a main routine of a driving skill evaluation process performed by the driving skill evaluation system according to the embodiment.

FIG. 3 is a flowchart illustrating a main routine of a driving skill evaluation process performed by the processor 51 of the information processing device 50.

First, when the driving skill evaluation system 10 is activated, the driver information obtainer 63 of the processor 51 executes a process of specifying the driver of the vehicle 1 (step S11). For example, the driver information obtainer 63 executes a process of recognizing the face of the driver seated in the driver's seat, based on the image data transmitted from the in-vehicle camera 13. The driver information obtainer 63 records identification information of the specified driver in the storage 53. The driver information obtainer 63 may specify the driver, based on driver information input to the input device 21.

Substantially, the processor 51 determines whether to start execution of a process of evaluating the driving skill of the driver (hereafter also referred to as "driving skill evaluation process") (step S13). A condition for starting execution of the driving skill evaluation process is not limited. For example, when the driving skill evaluation process is executed between the start of driving of the vehicle 1 by the driver and the end of driving, the processor 51 may determine to start the driving skill evaluation process at the time of activation of a driving system. Alternatively, the processor 51 may determine to start execution of the driving skill evaluation process when it is detected that the driver is seated in the driver's seat, based on an output signal of the in-vehicle camera 13, a load sensor installed in the driver's seat, or the like.

The driving skill evaluation process may be set to be executed when the vehicle 1 travels in a preset specific section. In this case, the processor 51 may determine to start the driving skill evaluation process when the position of the vehicle 1 transmitted from the vehicle position detection sensor 19 reaches the specific section. The occupant such as the driver can set any start and end timings of the driving skill evaluation process. In this case, the processor 51 may determine to start execution of the driving skill evaluation process at the set start timing of the driving skill evaluation process.

If the processor 51 determines not to start execution of the driving skill evaluation process (S13/No), the processor 51 repeatedly executes the determination process in step S13. If the processor 51 determines to start execution of the driving skill evaluation process (S13/Yes), the driver information obtainer 63 starts to record the driving state of the driver (step S15). For example, the driver information obtainer 63 starts a process of detecting the direction of the line of sight of the driver, based on the image data transmitted from the in-vehicle camera 13. In addition, the driver information obtainer 63 starts a process of obtaining the biometric information of the driver, based on the detection data transmitted from the biometric sensor 15. The driver information obtainer 63 records information on the detected driving state of the driver in the storage 53 as time-series data.

Subsequently, the surrounding environment detector 61 of the processor 51 starts to record the surrounding environment of the vehicle 1 (step S17). For example, the surrounding environment detector 61 starts a process of detecting an obstacle present around the vehicle 1 and a road shape or a traveling lane, based on the detection data transmitted from the surrounding environment sensor 11. In addition, the surrounding environment detector 61 obtains the position information of the vehicle 1 transmitted from the vehicle position detection sensor 19, and records the position information in the storage 53 as time-series data together with the surrounding environment information.

Subsequently, the vehicle state detector 65 of the processor 51 starts to record the behavior and the operation state of the vehicle 1 (step S19). For example, the vehicle state detector 65 detects the behavior of the vehicle 1 and the operation states of the steering wheel, the accelerator pedal, and the brake pedal, based on the detection data transmitted from the vehicle state sensor 17. The behavior of the vehicle 1 includes the speed, acceleration, jerk, and yaw rate of the vehicle 1. In this embodiment, longitudinal jerk and yaw angular acceleration of the vehicle 1 are recorded as the information on the behavior of the vehicle 1. The longitudinal jerk is obtained by differentiating the acceleration detected by the acceleration sensor with respect to time. The acceleration can also be obtained by differentiating the speed of the vehicle 1 detected by the vehicle speed sensor with respect to time. The yaw angular acceleration is obtained by differentiating the yaw rate with respect to time. The vehicle state detector 65 records information on the behavior and the operation state of the vehicle 1 in the storage 53 as time-series data.

Subsequently, the driving skill evaluator 69 of the processor 51 evaluates the driving skill of the driver, based on the recorded time-series data of the behavior of the vehicle 1 (step S21). For example, after the end of a freely set travel section, the driving skill evaluator 69 evaluates the driving skill of the driver, based on the time-series data of the behavior of the vehicle 1 recorded in the travel section. The travel section is set as, for example, a section from the start to the end of driving of the vehicle 1. However, the travel section may be set as a continuous travel time, a travel distance, or a section between specific positions.

In step S21, a driving skill score y is calculated using the recorded time-series data of the behavior of the vehicle 1 without consideration of the situation in which the driving operation performed by the driver is restricted. In this embodiment, an example of a calculation formula of the driving skill score y used in the basic evaluation method is illustrated in Formula (1) below.

$$y = a*x1 + b*x2 \tag{1}$$

y: driving skill score x1: mean value of yaw angular acceleration per certain distance x2: mean value of longitudinal jerk per certain distance The term "a*x1" in the above Formula (1) corresponds to an evaluation item mainly reflecting the driving skill of a steering operation by the driver. In addition, the term "b*x2"

corresponds to an evaluation item mainly reflecting the driving skill of an operation performed by the driver on the accelerator pedal and the brake pedal. In Formula (1), coefficients a and b of the respective terms are set such that the value of the driving skill score y increases as the values of the yaw angular acceleration and the longitudinal jerk decrease. That is, the coefficients a and b are set so as to obtain a calculation result in which the driving skill is more highly evaluated as the behavior of the vehicle 1 is more stable. For example, the coefficients a and b may be set such that the driving skill score y becomes a value between approximately 0 to 100 points. The driving skill score y is calculated using a piece of driving data recorded in a situation in which the driving operation is not restricted, from among pieces of driving data of drivers recorded in the driving record database 43.

For example, the driving skill evaluator 69 divides the travel section to be evaluated for each of certain distances, for each of straight sections and curve sections, or for each stopping at an intersection, and calculates driving skill scores y1, y2, . . . , and yn for each of the sections. Then, the driving skill evaluator 69 sets a mean value of the driving skill scores y1, y2, . . . , and yn of all the travel sections to be evaluated as a total score Y.

Subsequently, the driving operation restriction determiner 67 of the processor 51 determines the situation in which the driving operation of the vehicle 1 performed by the driver is restricted (step S23). The driving operation restriction determiner 67 determines the situation in which the driving operation performed by the driver is restricted from the viewpoint of an external factor, which does not depend on the driving state of the driver, and an internal factor, which depends on the driving state of the driver. The determination is performed based on the recorded time-series data of the information on the surrounding environment of the vehicle 1 and the information on the driving state of the driver.

FIG. 4 illustrates examples of the situation in which the driving operation performed by the driver is restricted.

As the situation in which the driving operation performed by the driver is restricted due to the external factor, a situation in which a preceding vehicle is slow, a situation in which a following vehicle is tailgating, a situation in which there is an obstacle on the road, and a situation in which a road condition is bad are illustrated. The driving operation restriction determiner 67 determines whether the vehicle 1 is in the situation in which the driving operation performed by the driver is restricted due to the external factor, mainly based on information on the surrounding environment of the vehicle 1 and the driving state of the driver. In addition, as the situation in which the driving operation performed by the driver is restricted due to the internal factor, a situation in which the driver is fatigued and a situation in which the driver has no time to spare are illustrated. The driving operation restriction determiner 67 determines whether the vehicle 1 is in the situation in which the driving operation performed by the driver is restricted due to the internal factor, mainly based on the information on the driving state of the driver.

FIGS. 5 to 10 illustrate determination conditions for each of situations in which the driving operation performed by the driver is restricted.

FIG. 5 illustrates determination conditions for the situation in which the preceding vehicle is slow. For example, the driving operation restriction determiner 67 determines that the vehicle 1 is in the situation in which the preceding vehicle is slow in a section where an inter-vehicle distance between the vehicle 1 and the preceding vehicle is continuously shorter than a normal-driving inter-vehicle distance for a predetermined time or more. The normal-driving inter-vehicle distance is recorded in the driving record database 43. The normal-driving inter-vehicle distance may be, for example, a mean value of inter-vehicle distances recorded in a situation in which the driving operation is not restricted, in previous driving data of the same driver. If there is no previous driving data of the same driver, the normal-driving inter-vehicle distance may be a mean value of inter-vehicle distances recorded in a situation in which the driving operation is not restricted, in previous driving data of another driver. If the previous driving data of another driver is to be referred to, driving data of a driver, whose driving skill is at the same level, driving a type of vehicle, whose size or output is the same as that of the vehicle 1, is to be referred to. Thus, even if the driver of the vehicle 1 drives the vehicle 1 for the first time, the situation in which the driving operation of the vehicle 1 performed by the driver is restricted can be determined with high accuracy.

The driving operation restriction determiner 67 determines that the vehicle 1 is in the situation in which the preceding vehicle is slow in a section where the relative speed of the preceding vehicle with respect to the vehicle 1 is less than or equal to a threshold value. The threshold value of the relative speed may be set to any value. The driving operation restriction determiner 67 determines that the vehicle 1 is in the situation in which the preceding vehicle is slow in a section where a frequency of a brake operation is high. For example, if the number of times of depression of the brake pedal per predetermined unit time or unit distance, which is freely set, is greater than or equal to a predetermined threshold value, the driving operation restriction determiner 67 can determine that the frequency of the brake operation is high. The threshold value of the number of times of depression of the brake pedal may be set to any value. The threshold value may be set based on the frequency of the brake operation which is not caused by the road shape in a situation in which the driving operation is not restricted, in the previous driving data of the same driver or another driver recorded in the driving record database 43.

The driving operation restriction determiner 67 determines that the vehicle 1 is in the situation in which the preceding vehicle is slow in a section where the driver frequently gazes at the preceding vehicle. For example, if the number of times of gazing at the preceding vehicle per predetermined unit time or unit distance, which is freely set, is greater than or equal to a predetermined threshold value, the driving operation restriction determiner 67 can determine that the driver frequently gazes at the preceding vehicle. The threshold value of the number of times of gazing at the preceding vehicle may be set to any value. The threshold value may be set based on the number of times of gazing at the preceding vehicle in a situation in which the driving operation is not restricted, in the previous driving data of the same driver or another driver recorded in the driving record database 43. Whether the driver is gazing at the preceding vehicle can be determined based on, for example, whether the direction of the line of sight of the driver is directed toward the preceding vehicle.

Note that the determination conditions for the situation in which the preceding vehicle is slow illustrated in FIG. 5 are examples. Details of the determination conditions may be changed as appropriate, and further another determination condition may be set.

FIG. 6 illustrates determination conditions for the situation in which the following vehicle is tailgating. For example, the driving operation restriction determiner 67 determines that the vehicle 1 is in the situation in which the following vehicle is tailgating in a section where an inter-vehicle distance between the vehicle 1 and the following vehicle is continuously shorter than a normal-driving inter-vehicle distance for a predetermined time or more. The normal-driving inter-vehicle distance is recorded in the driving record database 43. Similarly to the above-described inter-vehicle distance between the vehicle 1 and the preceding vehicle, the normal-driving inter-vehicle distance may be a mean value of inter-vehicle distances recorded in a situation in which the driving operation is not restricted, in the previous driving data of the same driver or another driver. The driving operation restriction determiner 67 determines that the vehicle 1 is in the situation in which the following vehicle is tailgating in a section where the relative speed of the following vehicle with respect to the vehicle 1 is greater than or equal to a threshold value. The threshold value of the relative speed may be set to any value.

The driving operation restriction determiner 67 determines that the vehicle 1 is in the situation in which the following vehicle is tailgating in a section where the driver performs a specific driving operation in a situation in which the following vehicle is present. For example, the driving operation restriction determiner 67 determines that the vehicle 1 is in the situation in which the following vehicle is tailgating in a section where the speed of the vehicle 1 is higher than a normal-driving vehicle speed recorded in the driving record database 43. The normal-driving vehicle speed may be, for example, a mean value of vehicle speeds at the time of traveling on a road of the same speed limit, recorded in a situation in which the driving operation is not restricted, in the previous driving data of the same driver. If there is no previous driving data of the same driver, the normal-driving vehicle speed may be a mean value of the vehicle speed at the time of traveling on a road of the same speed limit, recorded in a situation in which the driving operation is not restricted, in the previous driving data of another driver.

The driving operation restriction determiner 67 may determine that the vehicle 1 is in the situation in which the following vehicle is tailgating in a section where the driver performs meandering driving in which the rotation direction of the steering wheel is frequently switched or a section where rapid acceleration and rapid deceleration are repeated. For example, if the rotational direction of the steering wheel is switched a predetermined number of times or more at a time interval shorter than a predetermined time, the driving operation restriction determiner 67 can determine that the driver performs meandering driving. In addition, if a state in which the acceleration exceeds a predetermined threshold value and a state in which the deceleration exceeds a predetermined threshold value are repeated a predetermined number of times or more at less than a predetermined time interval, the driving operation restriction determiner 67 can determine that the driver repeats rapid acceleration and rapid deceleration. Each threshold value may be set to any value.

The driving operation restriction determiner 67 determines that the vehicle 1 is in the situation in which the following vehicle is tailgating in a section where the driver frequently gazes at a rearview mirror in a situation in which the following vehicle is present. For example, if the number of times of gazing at the rearview mirror per predetermined unit time or unit distance, which is freely set, is greater than or equal to a predetermined threshold value, the driving operation restriction determiner 67 can determine that the frequency of gazing at the rearview mirror is high. The threshold value of the number of times of gazing at the rearview mirror may be set to any value. The threshold value may also be set based on the number of times of gazing at the rearview mirror in a situation in which the driving operation is not restricted, in the previous driving data of the same driver or another driver recorded in the driving record database 43. Whether the driver is gazing at the rearview mirror can be determined based on, for example, whether the direction of the line of sight of the driver is directed toward the rearview mirror. Instead of the rearview mirror or in addition to the rearview mirror, the number of times of gazing at a side mirror may be counted.

The driving operation restriction determiner 67 determines that the vehicle 1 is in the situation in which the following vehicle is tailgating in a section where the driver of the vehicle 1 is irritated in a situation in which the following vehicle is present. For example, based on the image data transmitted from the in-vehicle camera 13, if the driver is clicking his/her tongue or expressing an irritated facial expression, the driving operation restriction determiner 67 can determine that the driver is irritated. In addition, the driver's voice may be obtained by a microphone, and if the driver says something that expresses irritability, the driving operation restriction determiner 67 may determine that the driver is irritated.

Whether the driver is irritated can be determined based on the detection data transmitted from the biometric sensor 15. For example, the driving operation restriction determiner 67 can determine that the driver is irritated if one or more of the following conditions are satisfied: the heart rate of the driver is increasing, the blood pressure is increasing, and the body temperature is increasing. Alternatively, the driving operation restriction determiner 67 may determine that the driver is irritated by determining an increase in the body temperature or an increase in the amount of perspiration of the driver, based on the image data transmitted from the in-vehicle camera 13.

Note that the determination conditions for the situation in which the following vehicle is tailgating illustrated in FIG. 6 are examples. Details of the determination conditions may be changed as appropriate, and further another determination condition may be set.

Figure 7:
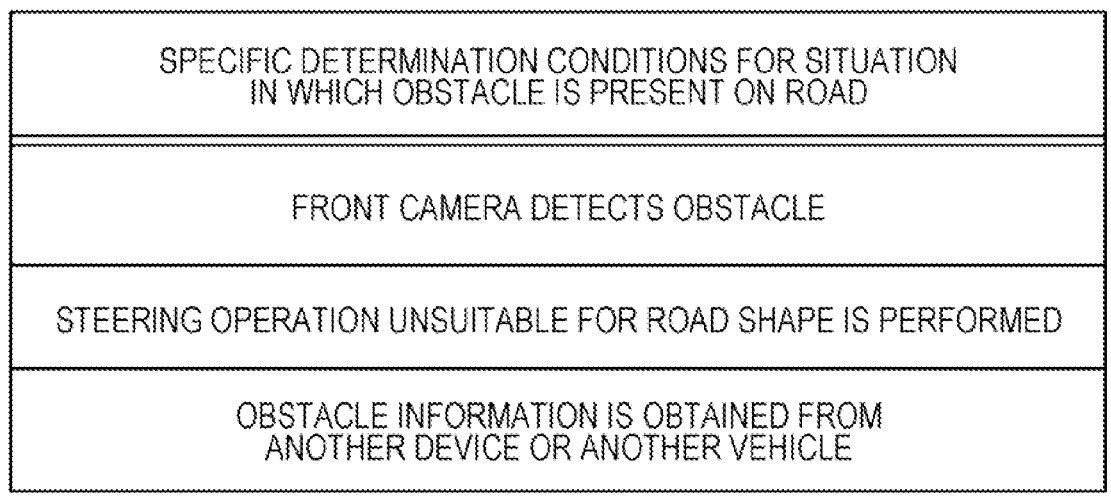
FIG. 7 illustrates determination conditions for a situation in which there is an obstacle on a road.

FIG. 7 illustrates determination conditions for the situation in which there is an obstacle on the road. For example, the driving operation restriction determiner 67 determines that the vehicle 1 is in the situation in which there is an obstacle on the road in a section from when the obstacle is detected on the road ahead in a traveling direction by the surrounding environment sensor 11 to when the vehicle 1 passes through the point where the obstacle is present. The obstacle is something other than the preceding vehicle traveling ahead in the traveling direction, such as a fallen object, a parked vehicle, a pedestrian, a bicycle, or the like. For example, the surrounding environment sensor 11 recognizes the obstacle as an object whose speed is less than a predetermined threshold value.

The driving operation restriction determiner 67 determines that the vehicle 1 is in the situation in which there is an obstacle on the road in a section where the driver performs a steering operation unsuitable for the road shape. The road shape may be specified based on the detection data of the surrounding environment sensor 11, or may be specified based on the current position and the traveling direction of the vehicle 1 on a map recorded in the high-precision map database 41. For example, the driving operation restriction determiner 67 compares a change in the rotation angle of the steering wheel assumed based on the radius of curvature of the specified road shape with a change in the actually operated steering angle, and determines that there is an obstacle on the road in a section where the difference in the rotation angle exceeds a predetermined threshold value.

The driving operation restriction determiner 67 determines that the vehicle 1 is in the situation in which there is an obstacle on the road in a predetermined section before and after the obstacle if the vehicle 1 obtains information on the obstacle ahead of the vehicle 1 from another device or another vehicle. For example, if the information on the obstacle in the traveling direction of the vehicle 1 is included as obstacle information provided from an external device via road-to-vehicle communication or mobile communication, or if the information on the obstacle in the traveling direction of the vehicle 1 is obtained by vehicle-to-vehicle communication with a preceding vehicle or an oncoming vehicle, the driving operation restriction determiner 67 determines that the vehicle 1 is in the situation in which there is an obstacle on the road in the predetermined section before and after the obstacle.

Note that the determination conditions for the situation in which there is an obstacle on the road illustrated in FIG. 7 are examples. Details of the determination conditions may be changed as appropriate, and further another determination condition may be set.

Figure 8:
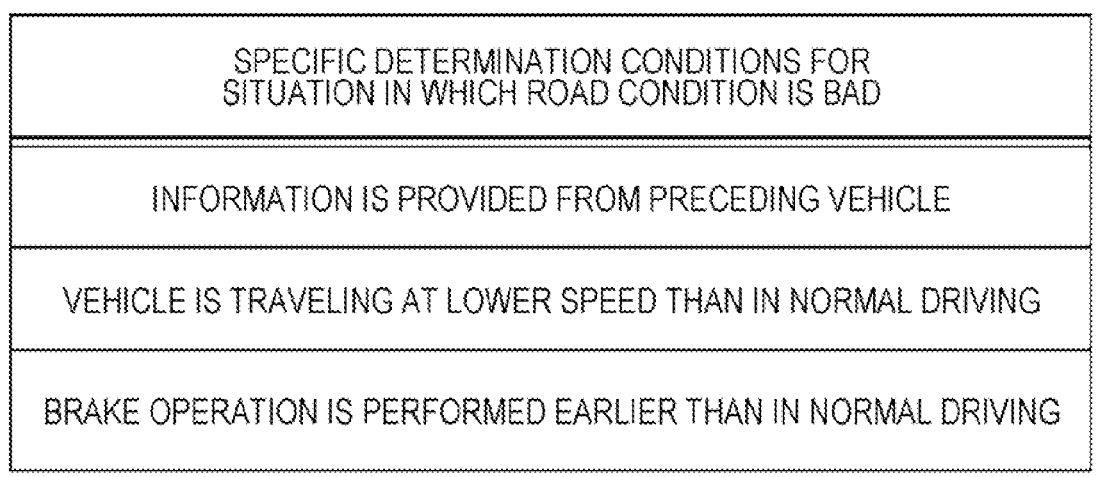
FIG. 8 illustrates determination conditions for a situation in which a road condition is bad.

FIG. 8 illustrates determination conditions for the situation in which the road condition is bad. For example, if information indicating that the road condition is bad is received from the preceding vehicle through vehicle-to-vehicle communication, the driving operation restriction determiner 67 determines that the vehicle 1 is in the situation in which the road condition is bad in the section where the information is received. For example, if the preceding vehicle determines that the road surface is slippery or the road surface has severe unevenness, based on a slip ratio of the wheels or the variation of the acceleration in the vertical direction of the vehicle body, the vehicle 1 obtains the information from the preceding vehicle.

The driving operation restriction determiner 67 determines that the vehicle 1 is in the situation in which the road condition is bad in a section where the vehicle speed of the vehicle 1 is lower than the normal-driving vehicle speed recorded in the driving record database 43 although the inter-vehicle distance to the preceding vehicle is large. The normal-driving vehicle speed may be, for example, a mean value of vehicle speeds at the time of traveling on a road of the same speed limit, recorded in a situation in which the driving operation is not restricted, in the previous driving data of the same driver or another driver.

The driving operation restriction determiner 67 determines that the vehicle 1 is in the situation in which the road condition is bad in a section where the timing of a brake operation is earlier than the timing of a brake operation during normal driving recorded in the driving record database 43. The timing of the brake operation is evaluated by comparing the start point of the brake operation in a traffic scene in which the brake operation is performed, for example, when entering a curve or when entering an intersection.

Note that the determination conditions for the situation in which the road condition is bad illustrated in FIG. 8 are examples. Details of the determination conditions may be changed as appropriate, and further another determination condition may be set.

FIG. 9 illustrates determination conditions for the situation in which the driver is fatigued. For example, the driving operation restriction determiner 67 determines that the vehicle 1 is in the situation in which the driver is fatigued in a section where the driver is drowsy. Whether the driver is drowsy can be determined by measuring the number of blinks, the number of yawns, shaking of the head, and the like of the driver, based on the image data transmitted from the in-vehicle camera 13, for example. In addition, whether the driver is drowsy can be determined based on the biometric information such as the heart rate or mentalis muscle activity amount of the driver transmitted from the biometric sensor 15. Furthermore, it can be determined that the driver is drowsy if a steering operation of about 11 Hz is performed based on a change in the rotation angle of the steering wheel.

The driving operation restriction determiner 67 determines that the vehicle 1 is in the situation in which the driver is fatigued in a section where a continuous driving time, which is a time during which the driver continues driving without taking a break, is greater than or equal to a predetermined threshold value. The continuous driving time may be, for example, an elapsed time after the system of the vehicle 1 is activated, or may be a time during which the same driver is specified by the driver information obtainer 63. The predetermined threshold value may be a preset certain value, or may be a value set for each driver, based on the previous driving time of the driver and a degree of fatigue (drowsiness) estimated from the detection data of the in-vehicle camera 13 or the biometric sensor 15.

The driving operation restriction determiner 67 determines that the vehicle 1 is in the situation in which the driver is fatigued in a section where the driver is estimated to be fatigued based on activity details and an activity time of the driver. The activity details and the activity time of the driver are obtained from schedule information recorded in a smartphone connected to the information processing device 50 via a Bluetooth (registered trademark) communication device or the like, for example. The driving operation restriction determiner 67 estimates the degree of fatigue, based on the activity details and the activity time. For example, the driving operation restriction determiner 67 obtains a value indicating the degree of fatigue by adding a value calculated by multiplying a coefficient of the degree of fatigue set according to the activity details such as sports or work by each activity time. The driving operation restriction determiner 67 estimates that the driver is fatigued if the value indicating the degree of fatigue exceeds a predetermined threshold value.

The driving operation restriction determiner 67 determines that the vehicle 1 is in the situation in which the driver is fatigued in a section where there is a little conversation between the driver and the occupant. Whether the driver and the occupant have conversation can be determined based on, for example, movements of the mouths of the driver and the occupant detected based on image data transmitted from the in-vehicle camera 13 or audio data input from a microphone. In addition, the driving operation restriction determiner 67 measures the number of times or duration of conversation between the driver and the occupant, and determines that the driver is fatigued if it is determined that the number of times of conversation per unit time has decreased or if it is determined that the duration of conversation has shortened. A specific method for determining that the number of times of conversation has decreased or the duration of conversation has shortened is not limited, and relative evaluation may be performed during a current driving period, or evaluation may be performed by comparison with previous driving data.

Note that the determination conditions for the situation in which the driver is fatigued illustrated in FIG. 9 are examples. Details of the determination conditions may be changed as appropriate, and further another determination condition may be set.

FIG. 10 illustrates determination conditions for the situation in which the driver has no time to spare. For example, the driving operation restriction determiner 67 determines that the vehicle 1 is in the situation in which the driver has no time to spare if there is no time to spare before the earliest schedule. The earliest schedule is obtained from schedule information recorded in a smartphone connected to the information processing device 50 via a Bluetooth (registered trademark) communication device or the like. The driving operation restriction determiner 67 can determine whether the driver has time to spare based on, for example, the start time of the obtained schedule and the distance to the site of the schedule.

The driving operation restriction determiner 67 determines that the vehicle 1 is in the situation in which the driver has no time to spare if it is determined that the driving state of the driver is in a more hurry than a normal driving state recorded in the driving record database 43. For example, in a situation in which there is no following vehicle, if a state in which the vehicle speed is higher than that in normal driving continues, the driving operation restriction determiner 67 determines that the vehicle 1 is in the situation in which the driver has no time to spare.

Note that the determination conditions for the situation in which the driver has no time to spare illustrated in FIG. 10 are examples. Details of the determination conditions may be changed as appropriate, and further another determination condition may be set.

In addition to the situations illustrated in FIGS. 5 to 10, a determination condition for determining a situation in which the driving operation is restricted may be set. For example, information may be shared between vehicles 1 via the driving record database 43. Thus, a situation in which many of drivers having high evaluation (total score Y) of driving skills have low evaluation results despite being a situation that is not recorded as a situation in which the driving operation was restricted is determined as a situation in which the driving operation was restricted. In this case, the driving operation restriction determiner 67 compares the information on the surrounding environment and the vehicle state in a situation in which evaluation results of many drivers are low with the information on the surrounding environment and the vehicle state in a situation in which the driving operation is not restricted. Thus, the driving operation restriction determiner 67 extracts a condition for determining that the vehicle 1 is in the situation in which the driving operation is restricted. In this manner, by newly adding the situation in which the driving operation is restricted, it is possible to detect a situation in which an unexpected driving operation is restricted and obtain an appropriate evaluation result of the driving skill.

The driving operation restriction determiner 67 refers to the determination conditions illustrated in FIGS. 5 to 10, and determines a section where the driving operation performed by the driver is restricted in a travel section where the driving skill is evaluated after the driving skill evaluation process is started. The driving operation restriction determiner 67 records information on details of a specific situation in association with each section where it is determined that the driving operation is restricted.

Referring back to FIG. 3, the driving skill evaluator 69 adjusts the evaluation method of the driving skill, based on the situation in which the driving operation performed by the driver is restricted, and adjusts the evaluated result calculated in step S21 (step S25). In this embodiment, the driving skill evaluator 69 adjusts the evaluation method by any one or more of a first adjustment method, a second adjustment method, and a third adjustment method according to the situation in which the driving operation performed by the driver is restricted. In the first adjustment method, an evaluation standard of the driving skill based on the total score Y is adjusted. In the second adjustment method, evaluation items of the basic evaluation method using the above Formula (1) are adjusted. In the third adjustment method, the evaluation is performed by an individual evaluation method different from the basic evaluation method.

Figure 11:
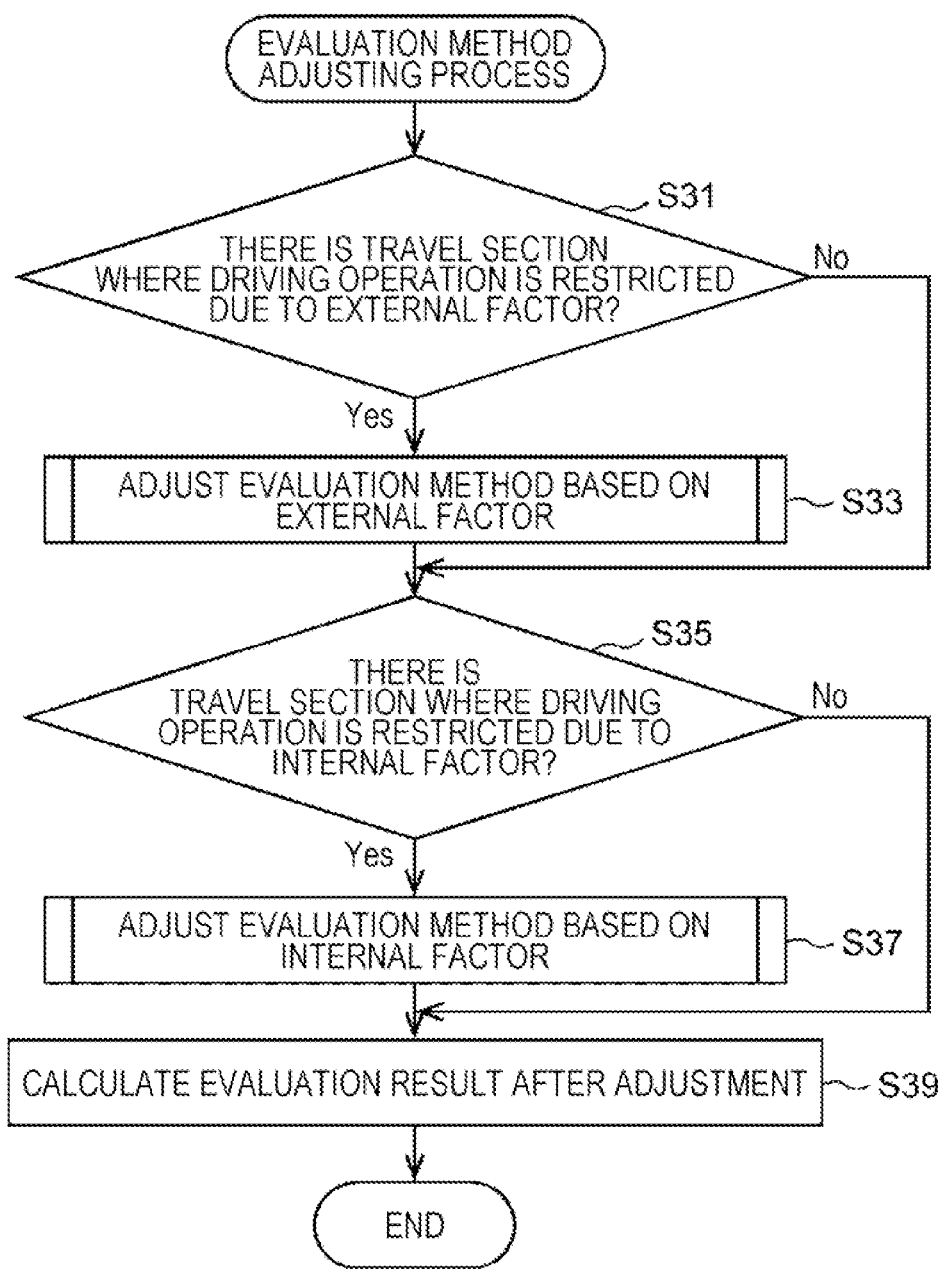
FIG. 11 is a flowchart illustrating a process of adjusting an evaluation method of a driving skill according to the embodiment.

FIG. 11 is a flowchart illustrating a process of adjusting the evaluation method of the driving skill.

First, the driving skill evaluator 69 determines whether there is a travel section where the driving operation is restricted due to the external factor illustrated in FIGS. 5 to 8 in the travel section where the driving operation is restricted (step S31). If there is no travel section where the driving operation is restricted due to the external factor (S31/No), the process directly proceeds to step S35. On the other hand, if there is a travel section where the driving operation is restricted due to the external factor (S31/Yes), the driving skill evaluator 69 executes a routine of adjusting the evaluation method based on the external factor (step S33).

Figure 12:
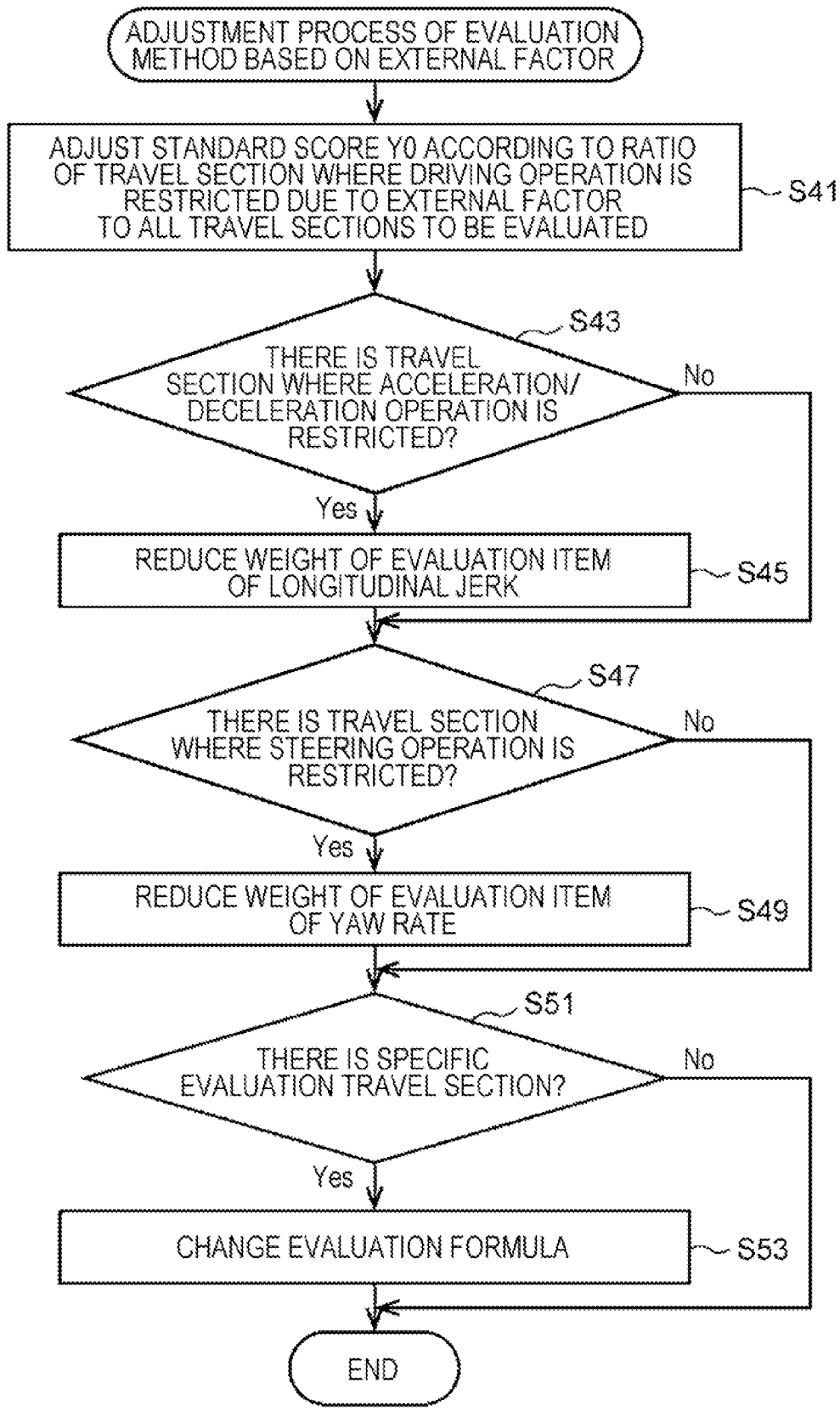
FIG. 12 is a flowchart illustrating a process of adjusting the evaluation method of the driving skill based on an external factor.

FIG. 12 is a flowchart illustrating the routine of adjusting the evaluation method based on the external factor. First, the driving skill evaluator 69 adjusts a predetermined standard score (evaluation standard) Y0 according to a ratio R1 of the travel section where the driving operation is restricted due to the external factor to all the travel sections to be evaluated (first adjusting method) (step S41).

The standard score Y0 is a set value used as a threshold value for notifying the driver of a caution or warning if, for example, the total score Y calculated by the above Formula (1) is less than or equal to the standard score (evaluation standard) Y0. For example, if the driving operation performed by the driver is restricted due to the external factor caused by another vehicle or the road shape illustrated in FIGS. 5 to 8, the standard score Y0 is lowered so that the driver is less likely to be notified of a caution or warning not caused by himself/herself. For example, a caution or warning is set to be issued if the total score Y is less than or equal to 50 points (standard score Y0) in the absence of the situation in which the driving operation performed by the driver is restricted. In this case, the driving skill evaluator 69 lowers the standard score Y0 according to the ratio R1.

For example, the driving skill evaluator 69 subtracts, from 50, a value obtained by multiplying the ratio R1 by 5 to obtain the adjusted standard score Y0. Accordingly, if the driving operation is restricted due to the external factor, the possibility that the total score Y becomes less than or equal to the standard score Y0 is reduced, and the driver is less likely to be notified of a caution or warning. Therefore, it is possible to prevent a decrease in the reliability of the driver with respect to the evaluation result of the driving skill.

Subsequently, the driving skill evaluator 69 determines whether there is a travel section where an acceleration/deceleration operation is restricted in the travel section where the driving operation is restricted (step S43). For example, in a case where a preset determination condition is satisfied, such as a case where the preceding vehicle repeatedly performs rapid deceleration and rapid acceleration, the driving skill evaluator 69 determines that the acceleration/deceleration operation is restricted. The condition for determining whether the acceleration/deceleration operation is restricted is not limited to the above example, and may be set as appropriate.

If there is no travel section where the acceleration/deceleration operation is restricted (S43/No), the process directly proceeds to step S47. On the other hand, if there is a travel section where the acceleration/deceleration operation is restricted (S43/Yes), the driving skill evaluator 69 adjusts Formula (1) such that a weight of the evaluation item "b*x2" related to the longitudinal jerk becomes small in the travel section where the acceleration/deceleration operation is restricted (second adjustment method) (step S45). For example, if a weight ratio of the evaluation items "a*x1" and "b*x2" in the basic evaluation method is 5:5, the weight ratio of the evaluation items is changed to 5:4, 5:3, or the like to adjust the weighting. Alternatively, the weight ratio is changed to 5:0 so that the evaluation item "b*x2" of the longitudinal jerk is not reflected in the driving skill score y. Accordingly, the degree to which the acceleration/deceleration operation restricted due to the external factor is reflected in the driving skill score y is reduced, and the evaluation result of the driving skill is easily obtained based on the driving operation that is not restricted. Therefore, it is possible to prevent a decrease in the reliability of the driver with respect to the evaluation result of the driving skill.

Subsequently, the driving skill evaluator 69 determines whether there is a travel section where the steering operation is restricted in the travel section where the driving operation is restricted (step S47). For example, in a case where a preset determination condition is satisfied, such as a case where the steering operation for avoiding a fallen object is performed, the driving skill evaluator 69 determines that the steering operation is restricted. The condition for determining whether the steering operation is restricted is not limited to the above example, and may be set as appropriate.

If there is no travel section where the steering operation is restricted (S47/No), the process directly proceeds to step S51. On the other hand, if there is a travel section where the steering operation is restricted (S47/Yes), the driving skill evaluator 69 adjusts Formula (1) such that a weight of the evaluation item "a*x1" related to the yaw rate is reduced in the travel section where the steering operation is restricted (second adjustment method) (step S49). For example, if the weight ratio of the evaluation items "a*x1" and "b*x2" in the basic evaluation method is 5:5, the weight ratio of the evaluation items is changed to 4:5, 3:5, or the like to adjust the weighting. Alternatively, the weight ratio is changed to 0:5 so that the evaluation item "a*x1" of the yaw rate is not reflected in the driving skill score y. Accordingly, the degree to which the steering operation restricted due to the external factor is reflected in the driving skill score y is reduced, and the evaluation result of the driving skill is easily obtained based on the driving operation that is not restricted. Therefore, it is possible to prevent a decrease in the reliability of the driver with respect to the evaluation result of the driving skill.

Subsequently, the driving skill evaluator 69 determines whether there is a travel section where the driving skill is evaluated by a preset individual evaluation method in the travel section where the driving operation is restricted (step S51). For example, if traveling on a congested expressway, it is desirable to continue low-speed traveling without repeating stopping and starting as much as possible in order to alleviate congestion. In this case, the evaluation result of the driving skill suitable for the traveling scene can be obtained by evaluating the relative speed to the preceding vehicle rather than using the evaluation item "a*x1" of the yaw rate in the above Formula (1). Therefore, if there is a travel section where the preceding vehicle is slow as illustrated in FIG. 5 during traveling on the expressway, the driving skill evaluator 69 determines that there is a travel section where the driving skill is evaluated by the individual evaluation method.

If there is no travel section where the driving skill is evaluated by the preset individual evaluation method (S51/No), the routine of adjusting the evaluation method based on the external factor is ended. On the other hand, if there is a travel section where the driving skill is evaluated by the preset individual evaluation method (S51/Yes), the driving skill evaluator 69 changes the formula used for evaluating the driving skill in the section to a preset formula (third adjustment method) (step S53). Then, the driving skill evaluator 69 ends the routine of adjusting the evaluation method based on the external factor. In the above example, for the section where the preceding vehicle is slow as illustrated in FIG. 5 during traveling on the expressway, the driving skill of the driver is evaluated by the individual evaluation method using the following Formula (2), which is different from the basic evaluation method using the above Formula (1).

$$y = 100 - b^{*}x2 - c^{*}x3 \qquad (2)$$

x2: mean value of longitudinal jerk per certain distance
x3: mean value of relative speed with respect to preceding vehicle per certain distance Both the terms "b*x2" and the term "c*x3" in the above Formula (2) correspond to evaluation items reflecting the driving skill of the driver's operation of the accelerator pedal and the brake pedal. The term "b*x2" is a value reflecting the frequency of stopping and starting operations, and the term "c*x3" is a value reflecting the degree to which the vehicle speed can be maintained at the same level as that of the preceding vehicle. In Formula (2), coefficients b and c of the respective terms are set such that the value of the driving skill score y increases as the values of the longitudinal jerk and the relative speed decrease. Similarly to Formula (1) used for the basic evaluation method, the coefficients b and c may be set such that the driving skill score y becomes a value between approximately 0 to 100 points. The driving skill score y is calculated using a piece of driving data in which the driving operation is not restricted, from among the pieces of driving data recorded in the driving record database 43.

The travel section where the driving skill is evaluated by the individual evaluation method is not limited to the above-described example, and may be set to any section. For example, an individual evaluation method set for a parking operation or an obstacle avoidance operation may be used in addition to the traffic congestion. In addition, the formula used in each individual evaluation method is set as appropriate so that the driving skill expected according to each traveling scene is appropriately evaluated.

Referring back to FIG. 11, subsequently, the driving skill evaluator 69 determines whether there is a travel section where the driving operation is restricted due to the internal factor illustrated in FIGS. 9 to 10 in the travel section where the driving operation is restricted (step S35). If there is no travel section where the driving operation is restricted due to the internal factor (S35/No), the process directly proceeds to step S39. On the other hand, if there is a travel section where the driving operation is restricted due to the internal factor (S35/Yes), the driving skill evaluator 69 executes a routine of adjusting the evaluation method based on the internal factor (step S37).

Figure 13:
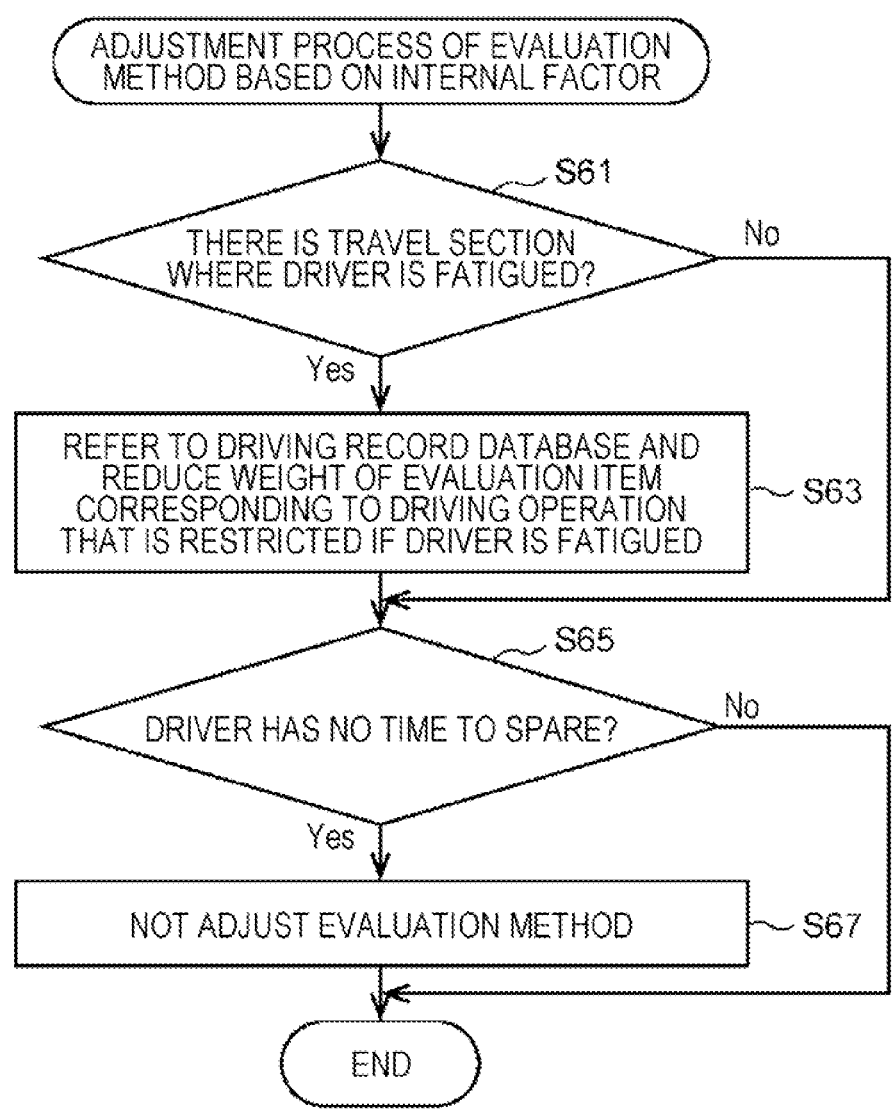
FIG. 13 is a flowchart illustrating a process of adjusting the evaluation method of the driving skill based on an internal factor.

FIG. 13 is a flowchart illustrating the routine of adjusting the evaluation method based on the internal factor. First, the driving skill evaluator 69 determines whether there is a travel section where the driver is fatigued, which satisfies the determination condition illustrated in FIG. 9, in the travel section where the driving operation is restricted (step S61). If there is no travel section where the driver is fatigued (S61/No), the process directly proceeds to step S65. On the other hand, if there is a travel section where the driver is fatigued (S61/Yes), the driving skill evaluator 69 refers to the driving data recorded in the driving record database 43. Then the driving skill evaluator 69 specifies a driving operation restricted in the situation in which the driver is fatigued and adjusts Formula (1) so that the weight of the evaluation item corresponding to the driving operation is reduced (second adjustment method) (step S63).

For example, from the driving data recorded in the driving record database 43, the driving skill evaluator 69 compares the driving operation in a state in which the driver is fatigued with the driving operation in a state in which the driver is not fatigued. The driving skill evaluator 69 determines the tendency of the change in the driving operation in a state in which the driver is fatigued. Then, the driving skill evaluator 69 specifies the driving operation restricted in the situation in which the driver is fatigued. The driving skill evaluator 69 reduces the weight of the evaluation item "b*x2" if the longitudinal jerk of the driving operation is the deceleration operation, and reduces the weight of the evaluation item "a*x1" of the yaw rate if the driving operation is the steering operation. Accordingly, the degree to which the driving operation restricted if the driver is fatigued is reflected in the driving skill score y is reduced, and the evaluation result of the driving skill is easily obtained based on the driving operation that is not restricted. Therefore, it is possible to prevent a decrease in the reliability of the driver with respect to the evaluation result of the driving skill.

Subsequently, the driving skill evaluator 69 determines whether there is a travel section where the driver has no time to spare, which satisfies the determination condition illustrated in FIG. 10, in the travel section where the driving operation is restricted (step S65). If there is no travel section where the driver has no time to spare (S65/No), the routine of adjusting the evaluation method based on internal factors is ended. On the other hand, if there is a travel section where the driver has no time to spare (S65/Yes), the driving skill evaluator 69 cancels the setting of adjustment of all the evaluation methods for the corresponding travel section. The driving skill evaluator 69 does not adjust the evaluation method (step S67) and ends the routine of adjusting the evaluation method based on the internal factor. The adjustment of the evaluation method for the travel section where the driver has no time to spare leads to justification of dangerous driving in a state in which the driver has no time to spare. For this reason, in this embodiment, if the driver has no time to spare, the vehicle speed is higher than normal, or there is a possibility that the driver ignores a traffic light or drives forcefully, all the evaluation methods are set not to be adjusted.

Alternatively, the driving skill evaluator 69 may evaluate the driving skill by excluding, from all the travel sections to be evaluated, a travel section where it is determined that the driver has no time to spare. On the other hand, if the travel section where the driver has no time to spare is excluded, a composition ratio of the driving skill score y of the travel section is set to zero, and the sum of composition ratios of the driving skill scores y of the other travel sections is maintained at 100(%). Accordingly, the evaluation of the section where the driving operation is restricted is excluded from the calculated evaluation result of the driving skill, and it is possible to increase the accuracy of the evaluation result of the driving skill.

Referring back to FIG. 11, subsequently, the driving skill evaluator 69 calculates an evaluation result after adjustment by the evaluation method that reflects the adjustment results in steps S33 and S37 (step S39). For example, for each travel section where the driving operation is restricted, the driving skill score y is calculated by adjusting the evaluation method by a method corresponding to the situation at that time. Then, the mean value of the driving skill scores y1, y2, . . . , and yn of all travel sections including the driving skill score y of the travel section where the driving operation is not restricted is set as the adjusted total score Y'. Accordingly, it is possible to obtain the evaluation result of the driving skill with less influence of the driving operation in the situation in which the driving operation performed by the driver is restricted.

Referring back to FIG. 3, the notification processor 71 of the processor 51 performs a process of feeding back the calculated evaluation result to the driver (step S27). For example, the notification processor 71 drives the output device 23 to display the evaluation result of the driving skill on the screen.

Figure 14:
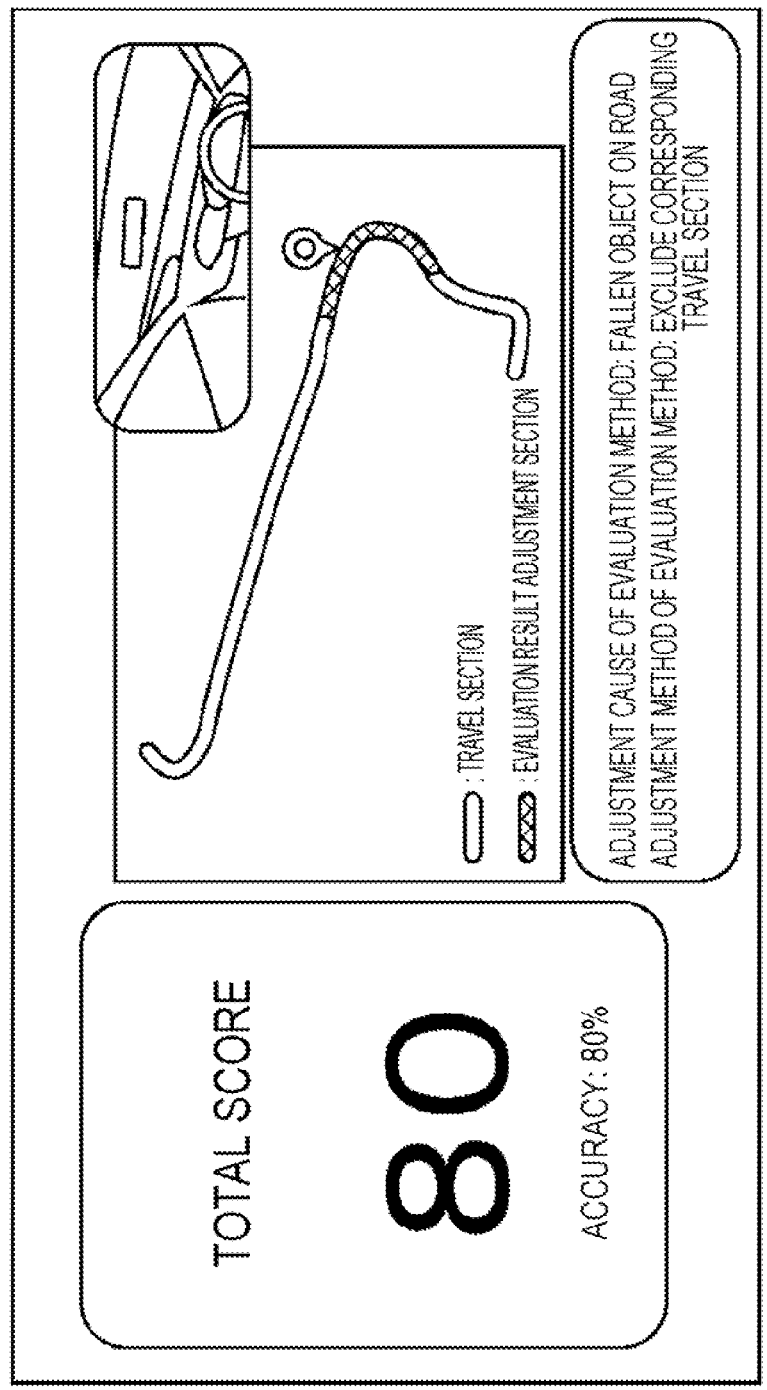
FIG. 14 illustrates an example of a displayed screen for notifying the driver of an evaluation result of the driving skill.

FIG. 14 illustrates an example of a displayed screen for notifying the driver of the evaluation result of the driving skill. The example of the displayed screen illustrated in FIG. 14 includes information on the total score (Y), all the travel sections, the travel section where the evaluation method is adjusted, the adjustment cause of the evaluation method, and the adjustment method of the evaluation method. When the evaluation result of the driving skill is fed back to the driver, the driver may be notified of part or all of the information by voice. Accordingly, the driver can know the reason why the driving operation is restricted and the evaluation result of the driving skill in a state where the driving operation is restricted for the reason, and can know that the evaluation of the driving skill of the driver himself/herself is appropriate. When the travel section where the evaluation method is adjusted is displayed, the image data during traveling in the travel section may also be displayed, or a reproduction operation may be enabled.

In addition, the example of the displayed screen illustrated in FIG. 14 includes information indicating the accuracy of the evaluation result (total score) of the driving skill. The accuracy may be, for example, information indicating the accuracy of determination as to whether the driving operation is restricted. In this case, the accuracy may be information indicating a degree of similarity between first data and second data. The first data is the data of the surrounding environment or the data of the driving state of the driver at the determination in step S23 that the driving operation is restricted. The second data is the driving data at the determination that the driving operation is restricted, similarly, from among the pieces of driving data recorded in the driving record database 43. The similarity of data may be obtained as a matching degree of data items such as the road shape, the number of lanes, the road condition, the relative position and relative speed of another vehicle, the presence or absence of an obstacle, and the physical condition of the driver, but any calculation method may be set. By notifying the driver of the accuracy of the evaluation result of the driving skill, it is possible for the driver to know that the evaluation of the driving skill is appropriate, and it is possible to increase the reliability with respect to the driving skill evaluation system 10.

In addition, the notification processor 71 notifies the driver of a caution or warning when the total score Y is less than or equal to the standard score Y0 (evaluation standard) adjusted according to the situation in which the driving operation is restricted. The caution or warning may be displayed on the screen or may be output by voice, or both. In addition, instead of the total score Y, if the driving skill score y of each travel section is less than or equal to the standard score Y0 (evaluation standard), the notification processor 71 may issue the caution or warning together with the notification of the corresponding travel section.

In addition, when notifying the driver of the evaluation result of the driving skill, the notification processor 71 may change the tone color or the volume in accordance with details of the evaluation result such as the value of the total score Y or the accuracy of the evaluation result. For example, the notification processor 71 generates a sound having a more pleasant tone as the value of the total score Y is larger. A chord having a larger number of types of musical tones may be generated as the value of the total score Y is larger. Furthermore, the notification processor 71 may increase the volume as the accuracy of the evaluation result is higher. Accordingly, when the evaluation result of the driving skill is fed back to the driver during driving, it is possible to cause the driver to intuitively recognize the evaluation result not through visual sense but through auditory sense. Also, it is possible to feed back the driving skill without impairing safe driving.

In addition, when notifying the driver of the evaluation result of the driving skill, in a case where it is evaluated that a specific driving operation is appropriately performed in a situation in which the driving operation is restricted, the notification processor 71 may notify the driver that the evaluation result of the driving operation is high. For example, the notification processor 71 compares the value of the evaluation item "a*x1" or "b*x2" before the weight is reduced with the value of the evaluation item "a*x1" or "b*x2" in a situation in which the driving operation is not restricted, with respect to a driving operation (the acceleration/deceleration operation or the steering operation). The driving operation corresponds to the evaluation item whose weight is reduced in step S33 or step S37. Then, if the difference between the value of the evaluation item "a*x1" or "b*x2" and the value of the evaluation item "a*x1" or "b*x2" in a situation in which the driving operation is not restricted is less than a predetermined determination threshold value, the notification processor 71 determines that the evaluation result of the driving operation is high even in the situation in which the driving operation is restricted. Then, the notification processor 71 notifies the driver of the determination result. Accordingly, the driver can know that he/she has performed the driving operation appropriately even in the situation in which the driving operation is restricted, and the motivation to improve the driving skill can be increased.

Figure 15:
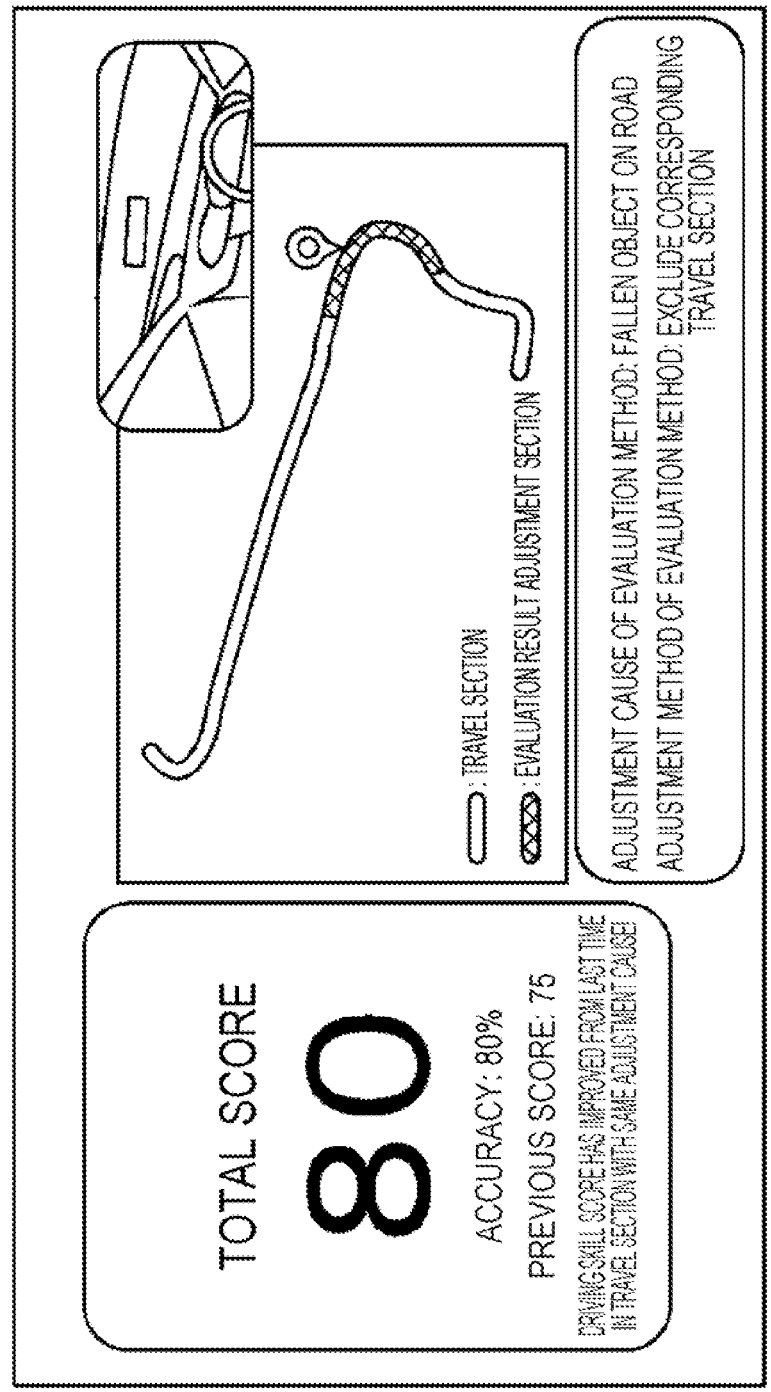
FIG. 15 illustrates a modification of the displayed screen for notifying the driver of the evaluation result of the driving skill.

FIG. 15 illustrates a modification of the displayed screen for notifying the driver of the evaluation result of the driving skill. When notifying the driver of the evaluation result of the driving skill, the notification processor 71 may compare this evaluation result with the evaluation result of the driving skill in a previous situation in which the driving operation is restricted during driving of the vehicle 1 of the same vehicle type in the same traveling scene, and may also notify the driver of the comparison result. For example, the notification processor 71 refers to the driving data recorded in the driving record database 43. The notification processor 71 determines whether there is a record of the driving data in which the driving operation is restricted in the travel section having the same surrounding environment as the surrounding environment of the travel section where the driving operation is restricted, from among all the travel sections to be evaluated. If there is a record of previous driving data, the notification processor 71 compares the evaluation result (driving skill score y) in the situation in which the driving operation is restricted this time with the evaluation result (driving skill score y) in the situation in which the driving operation is restricted in the past. Then, the notification processor 71 displays the previous evaluation result together with the current evaluation result, and displays whether the evaluation of the driving skill has increased or decreased.

In addition, as illustrated in FIG. 15, in the driving data recorded in the driving record database 43, if the current driving skill score y is higher than the driving skill score y in a state in which the driving operation of the same driver is restricted due to the same adjustment cause, the notification processor 71 may notify the driver that the evaluation result of the driving operation in the section where the evaluation method is adjusted is high. Accordingly, the driver can know that the driving skill has improved in the situation in which the specific driving operation is restricted, and the motivation to improve the driving skill can be increased. In the example illustrated in FIG. 15, the text "driving skill score has improved from last time in travel section with same adjustment cause!" is displayed, but the driving skill score of the section may be displayed, or the driver may be notified by voice or sound effect.

At this time, if there is a record of previous driving data of the same driver, the evaluation result of the driver may be compared with the record. On the other hand, if there is no record of previous driving data of the same driver, the evaluation result may be compared with an evaluation result of another driver in the situation in which the driving operation is restricted in the same traveling scene.

After feeding back the evaluation result of the driving skill, the processor 51 determines whether to stop the driving skill evaluation process (step S29). For example, if the driving skill evaluation process is executed between the start and the end of driving of the vehicle 1 by the driver, the processor 51 may determine to stop the execution of the driving skill evaluation process upon completion of the feedback of the evaluation result of the driving skill. Alternatively, the processor 51 may determine to stop the execution of the driving skill evaluation process upon detection of the driver leaving the driver's seat, based on an output signal of the in-vehicle camera 13, a load sensor installed in the driver's seat, or the like. If the processor 51 determines to stop the driving skill evaluation process (S29/Yes), the processor 51 stops the driving skill evaluation process.

On the other hand, if the driving skill evaluation process is set to be executed when the vehicle 1 travels in a preset specific section, or if the occupant can freely set the execution timing of the driving skill evaluation process, for example, the driving skill evaluation process is continued even after the evaluation result of the driving skill is fed back. In this case (S29/No), the process returns to step S13, and the processor 51 waits until it is determined to start the driving skill evaluation process. If it is determined to start the driving skill evaluation process (S13/Yes), the processor 51 repeatedly executes the process of each step described above.

As described above, the driving skill evaluation system 10 according to the first embodiment of the present disclosure compares one or more of the surrounding environment of the vehicle 1 and the driving state of the driver with the predetermined determination condition to determine whether the vehicle is in the situation in which the driving operation performed by the driver is restricted. If the vehicle is in the situation in which the driving operation is restricted, the driving skill evaluation system 10 adjusts, based on the situation, the evaluation method of the driving skill, and performs the evaluation. Therefore, if the driving operation is restricted due to the external factor, which does not depend on the driving state of the driver, or the internal factor, which depends on the driving state of the driver, the influence on the evaluation result of the driving skill is reduced, and an appropriate evaluation result of the driving skill can be obtained.

Based on the situation in which the driving operation is restricted, the driving skill evaluation system 10 according to this embodiment adjusts the evaluation standard (standard score) of the driving skill (first adjustment method). Accordingly, if the driving operation is restricted due to the external factor, the possibility that the total score Y becomes less than or equal to the standard score Y0 is reduced, and the driver is less likely to be notified of a caution or warning. Therefore, it is possible to prevent a decrease in the reliability of the driver with respect to the evaluation result of the driving skill.

According to the situation in which the driving operation is restricted, the driving skill evaluation system 10 according to this embodiment adjusts the weighting of the evaluation item of the steering operation or the acceleration/deceleration operation performed by the driver or excludes any of the evaluation items to perform the evaluation of the driving skill (second adjustment method). Accordingly, the degree to which the driving operation restricted due to the external factor is reflected in the driving skill score y is reduced, and the evaluation result of the driving skill is easily obtained based on the driving operation that is not restricted. Therefore, it is possible to prevent a decrease in the reliability of the driver with respect to the evaluation result of the driving skill.

According to the situation in which the driving operation is restricted, the driving skill evaluation system 10 according to this embodiment performs the evaluation of the driving skill by the individual evaluation method different from the basic evaluation method (third adjustment method). Accordingly, the evaluation result of the driving skill can be obtained by using the evaluation method suitable for each traveling scene.

When notifying the driver of the evaluation result of the driving skill, the driving skill evaluation system 10 according to this embodiment notifies the driver of information indicating the accuracy of the evaluation result. Accordingly, it is possible for the driver to know that the evaluation of the driving skill is appropriate, and it is possible to increase the reliability with respect to the driving skill evaluation system 10.

When notifying the driver of the evaluation result of the driving skill, the driving skill evaluation system 10 according to this embodiment notifies the driver of information about the adjustment cause or the adjustment detail of the evaluation method of the driving skill. Accordingly, the driver can know the reason why the driving operation is restricted and the evaluation result of the driving skill in a state where the driving operation is restricted for the reason, and can know that the evaluation of the driving skill of the driver himself/herself is appropriate.

When notifying the driver of the evaluation result of the driving skill, the driving skill evaluation system 10 according to this embodiment notifies the driver of the comparison result with the evaluation result of the driving skill in a previous situation in which the driving operation is restricted in the same traveling scene. In addition, when notifying the driver of the evaluation result of the driving skill, the driving skill evaluation system 10 according to this embodiment notifies the driver that a specific driving operation is highly evaluated in a case where the specific driving operation is appropriately performed in the situation in which the driving operation is restricted. Accordingly, the driver can know that the driving skill has improved in the situation in which the specific driving operation is restricted, and the motivation to improve the driving skill can be increased.

The driving skill evaluation system 10 according to this embodiment performs one or more of determination of the situation in which the driving operation is restricted and the evaluation of the driving skill with reference to the driving data obtained when another driver having the same level of driving skill drives a vehicle of the same type as the vehicle 1, from among the pieces of driving data recorded in the driving record database 43. Accordingly, even if the driver drives the vehicle 1 of a vehicle type different from that of the vehicle that the driver usually drives, the driving skill can be evaluated based on the same standard as that of the vehicle that the driver usually drives.

2. Second Embodiment

Next, the driving skill evaluation system 10 according to a second embodiment of the present disclosure will be described. In this embodiment, the driving skill evaluator 69 adjusts the evaluation method, based on a ratio of the travel section where the driving operation is restricted to all travel sections to be evaluated.

A basic configuration of the driving skill evaluation system 10 according to this embodiment may be the same as the configuration of the driving skill evaluation system 10 described in the first embodiment. However, in the driving skill evaluation system 10 according to this embodiment, the process of adjusting the evaluation method by the driving skill evaluator 69 of the information processing device 50 is different from the process of adjusting the evaluation method by the driving skill evaluator 69 of the information processing device 50 according to the first embodiment. Hereinafter, differences of the driving skill evaluation system 10 according to this embodiment from the driving skill evaluation system 10 according to the first embodiment will be described.

Figure 16:
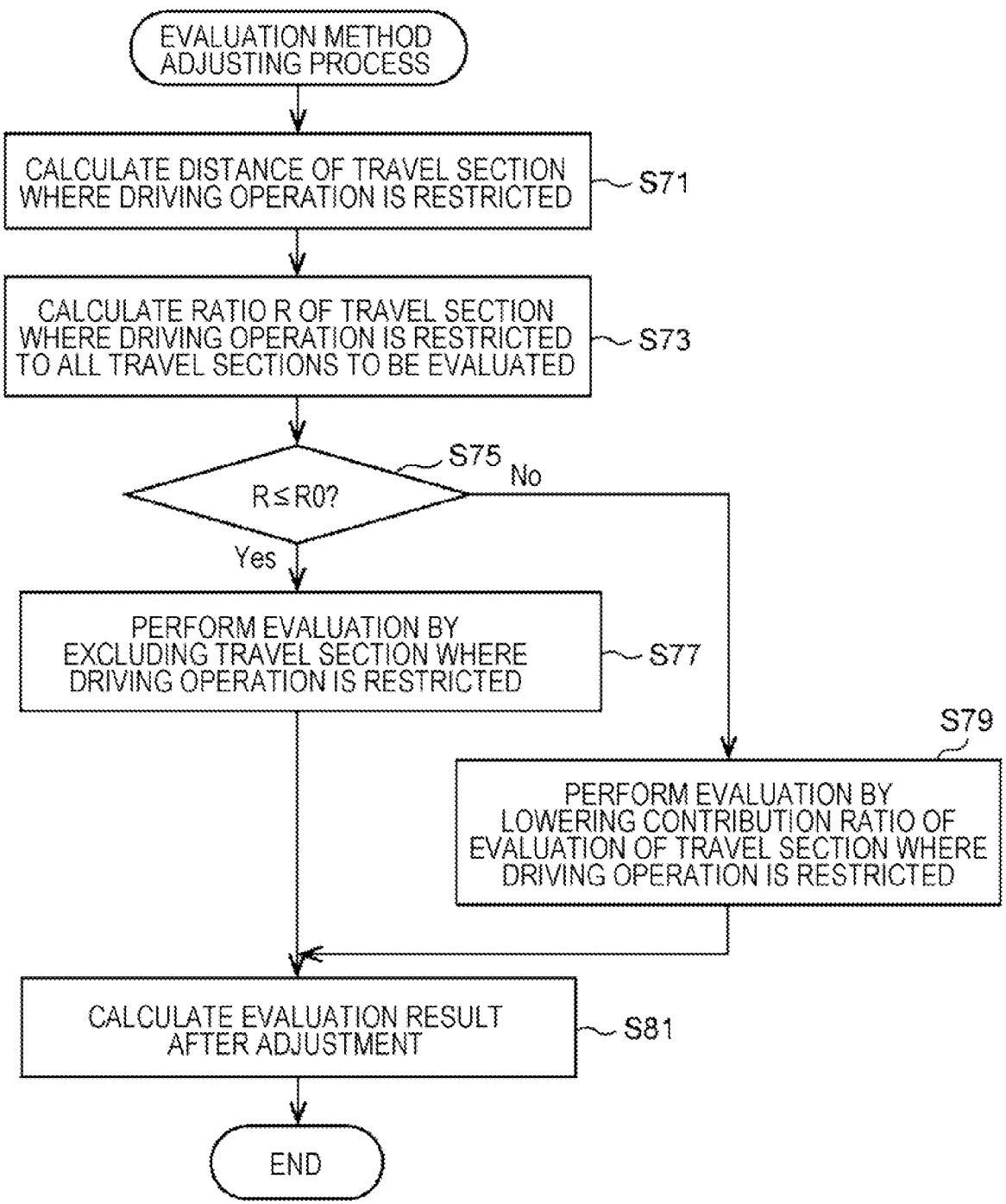
FIG. 16 is a flowchart illustrating a process of adjusting the evaluation method of the driving skill according to an embodiment.

FIG. 16 is a flowchart illustrating a process of adjusting the evaluation method of the driving skill according to this embodiment. The flowchart illustrated in FIG. 16 illustrates the routine in step S25 for adjusting the evaluation method in the flowchart illustrated in FIG. 3.

First, the driving skill evaluator 69 calculates the sum of the distances of the travel sections determined to be in the situation in which the driving operation is restricted in step S23 of the flowchart illustrated in FIG. 3 (step S71). Subsequently, the driving skill evaluator 69 calculates a ratio R of the distances of the travel sections where the driving operation is restricted to the distances of all the travel sections to be evaluated (step S73).

Subsequently, the driving skill evaluator 69 determines whether the calculated ratio R is greater than or equal to a predetermined threshold value R0 (step S75). If the ratio of the travel section where the driving operation is restricted is too large, the accuracy of the evaluation result of the driving skill decreases and the reliability with respect to the evaluation result decreases. Therefore, the threshold value R0 of the ratio R is set to any value in a range in which the travel section where the driving operation is restricted is allowed to be included in the evaluation target. For example, the threshold value R0 may be a value within a range of 20% to 30%, but is not limited to this range.

If the calculated ratio R is less than or equal to the predetermined threshold value R0 (S75/Yes), the driving skill evaluator 69 evaluates the driving skill by excluding the travel section where the driving operation is restricted (step S77). For example, if the mean value of the driving skill scores y1, y2, . . . , and yn of all the travel sections to be evaluated is set as the total score Y, in the absence of the travel section where the driving operation is restricted, the composition ratio is equally divided. Thus, the sum of the composition ratios of the driving skill scores y of the respective sections becomes 100(%). On the other hand, if the travel section where the driving operation is restricted is excluded, the composition ratio of the driving skill score y of the travel section is set to zero, and the sum of the composition ratios of the driving skill scores y of the other travel sections is maintained at 100(%). Accordingly, the evaluation of the section where the driving operation is restricted is excluded from the calculated evaluation result of the driving skill, and it is possible to increase the accuracy of the evaluation result of the driving skill.

On the other hand, if the calculated ratio R exceeds the predetermined threshold value R0 (S75/No), the driving skill evaluator 69 evaluates the driving skill by lowering a contribution ratio of the evaluation of the travel section where the driving operation is restricted (step S79). For example, the mean value of the driving skill scores y1, y2, . . . , and yn of all the travel sections to be evaluated is set as the total score Y. In this case, the contribution ratio of the evaluation of the travel section where the driving operation is restricted is lowered by decreasing the composition ratio of the section while maintaining the sum of the composition ratios of the driving skill scores y of the sections at 100(%). Accordingly, the contribution ratio of the evaluation of the section where the driving operation is restricted, to the calculated evaluation result of the driving skill, is reduced, and the evaluation result including the evaluation of the driving skill in the situation in which the driving operation is restricted can be obtained.

For example, the degree of decreasing the composition ratio may be set such that the degree of decreasing the composition ratio increases as a ratio r of the distance of each travel section where the driving operation is restricted to the distance of all travel sections increases.

Subsequently, the driving skill evaluator 69 calculates the evaluation result after the adjustment by the evaluation method reflecting the adjustment results in steps S77 and S79 (step S81). For example, the driving skill evaluator 69 calculates the driving skill scores y1, y2, . . . , and yn of all the travel sections including the travel section where the driving operation is restricted and the travel section where the driving operation is not restricted. The driving skill evaluator 69 reduces or excludes the contribution ratio of the driving skill score y of the travel section where the driving operation is restricted and sets the mean value of the driving skill scores y1, y2, . . . , and yn as the adjusted total score Y'. Accordingly, it is possible to obtain the evaluation result of the driving skill with less influence of the driving operation in the situation in which the driving operation performed by the driver is restricted.

In this embodiment, when the driving skill score y of each travel section of all the travel sections to be evaluated is calculated, the evaluation method may be adjusted according to the situation in which the driving operation is restricted as described in the first embodiment.

As described above, the driving skill evaluation system 10 according to the second embodiment adjusts the evaluation method of the driving skill according to the ratio R of the travel section where the driving operation is restricted, to the distances of all the travel sections to be evaluated. The driving skill evaluation system 10 according to the second embodiment can also achieve the same effects as the driving skill evaluation system 10 according to the first embodiment.

In addition, if the ratio R is less than or equal to the predetermined threshold value R0, the driving skill evaluation system 10 according to this embodiment obtains the evaluation result of the driving skill by excluding the evaluation of the section where the driving operation is restricted. Accordingly, it is possible to increase the accuracy of the evaluation result of the driving skill. If the ratio R exceeds the predetermined threshold R0, the driving skill evaluation system 10 evaluates the driving skill by lowering the contribution ratio of the evaluation of the travel section where the driving operation is restricted. Accordingly, it is possible to obtain the evaluation result of the driving skill in which the influence of the driving operation in the situation in which the driving operation performed by the driver is restricted is reduced.

In the example described in the second embodiment, the contribution ratio of the evaluation of the travel section is lowered or the evaluation of the travel section is excluded according to the ratio R of the travel section where the driving operation is restricted, to all the travel sections to be evaluated. However, the adjustment method of the evaluation method of this embodiment is not limited to the above example. For example, the driving skill score y of the travel section where the driving operation is restricted may be compared with the driving skill score y of the travel section where the driving operation is not restricted, and the driving skill score on the assumption that the driving operation is not restricted may be estimated. At this time, the driving skill score on the assumption that the driving operation is not restricted may be estimated from the driving skill score y of the section similar to the road shape of the travel section where the driving operation is restricted, in the travel section in which the driving operation is not restricted.

Although the embodiments of the present disclosure have been described above in detail with reference to the accompanying drawings, the technology of the present disclosure is not limited to such examples. It is clear that a person having ordinary skill in the art can conceive of various modifications or corrections within the technical idea described in the claims. It is to be understood that these are naturally included in the technical scope of the disclosure.

The processor 51 illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the surrounding environment detector 61, the driver information obtainer 63, the vehicle state detector 65, the driving operation restriction determiner 67, the driving skill evaluator 69, and the notification processor 71. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 2.

The invention claimed is:

1. A driving skill evaluation system configured to evaluate, based on data of a behavior and an operation state of a vehicle, a driving skill of a driver who drives the vehicle, the driving skill evaluation system comprising:
one or more processors; and
one or more memories communicatively connected to the one or more processors, wherein
the one or more processors are configured to:
compare one or both of a surrounding environment of the vehicle and a driving state of the driver with a predetermined determination condition to determine whether the vehicle is in a situation in which a driving operation performed by the driver is restricted;
adjust, based on the situation in which the driving operation is restricted, an evaluation method of the driving skill; and
perform an evaluation of the driving skill,
wherein the one or more processors are configured to adjust the evaluation method according to a ratio of a section to all travel sections, the section being a section where the vehicle is in the situation in which the driving operation is restricted, the all travel sections being sections where the driving skill is to be evaluated.

2. The driving skill evaluation system according to claim 1, wherein the one or more processors are configured to:
when the ratio is less than or equal to a predetermined threshold value, exclude the section where the vehicle is in the situation in which the driving operation is restricted to perform the evaluation of the driving skill.

3. The driving skill evaluation system according to claim 1, wherein the one or more processors are configured to:
when the ratio exceeds a predetermined threshold value, reduce a contribution ratio of the evaluation of the driving skill in the section where the vehicle is in the situation in which the driving operation is restricted, to be less than a contribution ratio of the evaluation of the driving skill in a section where the vehicle is not in the situation in which the driving operation is restricted, to perform the evaluation of the driving skill.

* * * * *